(12) United States Patent
Kawano et al.

(10) Patent No.: US 8,301,850 B2
(45) Date of Patent: Oct. 30, 2012

(54) MEMORY SYSTEM WHICH WRITES DATA TO MULTI-LEVEL FLASH MEMORY BY ZIGZAG INTERLEAVE OPERATION

(75) Inventors: Shinji Kawano, Yokohama (JP); Kazunori Sato, Yokohama (JP); Hitoshi Shimono, Yokohama (JP); Eriko Chiba, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 76 days.

(21) Appl. No.: 12/821,669

(22) Filed: Jun. 23, 2010

(65) Prior Publication Data
US 2011/0060866 A1    Mar. 10, 2011

(30) Foreign Application Priority Data

Sep. 8, 2009 (JP) ................................. 2009-207387

(51) Int. Cl.
*G06F 5/01* (2006.01)
*G06F 12/04* (2006.01)
(52) U.S. Cl. ................ 711/157; 711/103; 711/E12.002; 711/170
(58) Field of Classification Search .................. 711/103, 711/157, 170, E12.001, E12.002
See application file for complete search history.

(56) References Cited

U.S. PATENT DOCUMENTS

| 8,001,317 | B2 * | 8/2011 | Yeh et al. | ...................... 711/103 |
| 8,151,035 | B2 * | 4/2012 | Smith et al. | ................... 711/103 |
| 2005/0015539 | A1 * | 1/2005 | Horii et al. | ..................... 711/103 |
| 2011/0125959 | A1 * | 5/2011 | Yeung et al. | ................... 711/103 |
| 2011/0149650 | A1 * | 6/2011 | Huang et al. | ............. 365/185.03 |

FOREIGN PATENT DOCUMENTS

| JP | 2008-33801 | 2/2008 |
| JP | 2008-65859 | 3/2008 |
| JP | 2008-152464 | 7/2008 |
| JP | 2010-282492 | 12/2010 |
| WO | WO 2005/066792 A2 | 7/2005 |
| WO | WO 2005/066794 A2 | 7/2005 |
| WO | WO 2006/065566 A1 | 6/2006 |
| WO | WO 2009/013879 A1 | 1/2009 |

OTHER PUBLICATIONS

Office Action issued Aug. 30, 2011, in Japanese Patent Application No. 2009-207387 with English translation.
Office Action issued Oct. 27, 2011, in Korean Patent Application No. 10-2010-0085790 (with English-language translation).

* cited by examiner

*Primary Examiner* — Pierre-Michel Bataille
(74) *Attorney, Agent, or Firm* — Oblon, Spivak, McClelland, Maier & Neustadt, L.L.P.

(57) ABSTRACT

According to one embodiment, a memory system includes a first memory chip includes a first temporary memory and a first block, a second memory chip includes a second temporary memory and a second block, and a memory controller that controls writing of logical pages to the first and second memory chips. The memory controller forms a second unit having the same page number as the first unit by the first temporary memory and the lowermost physical page in the first block, forms a third unit having the same page number as the first unit by the second temporary memory and the lowermost physical page in the second block, and writes the logical pages by an interleave operation in order of the second unit, the third unit, the first unit in the first block, and the first unit in the second block.

6 Claims, 23 Drawing Sheets

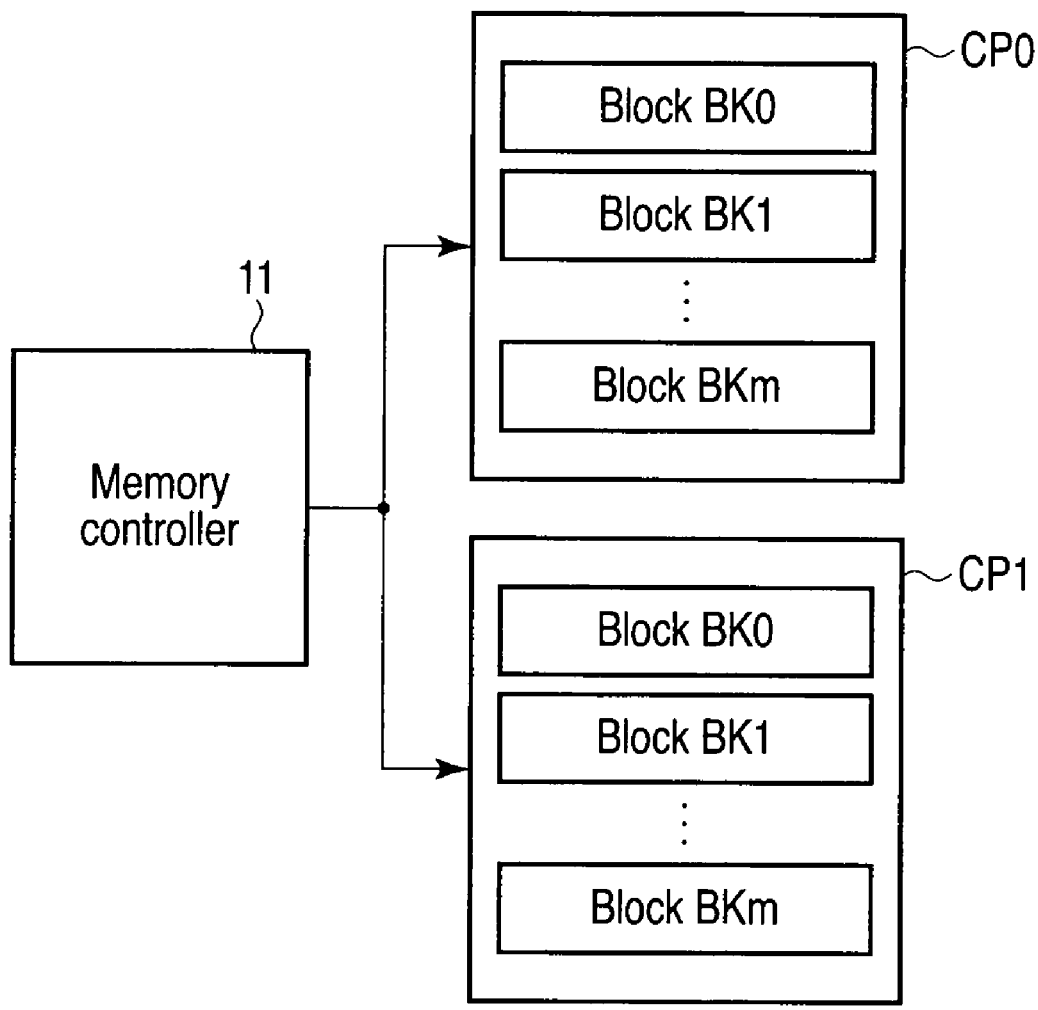
F I G. 1

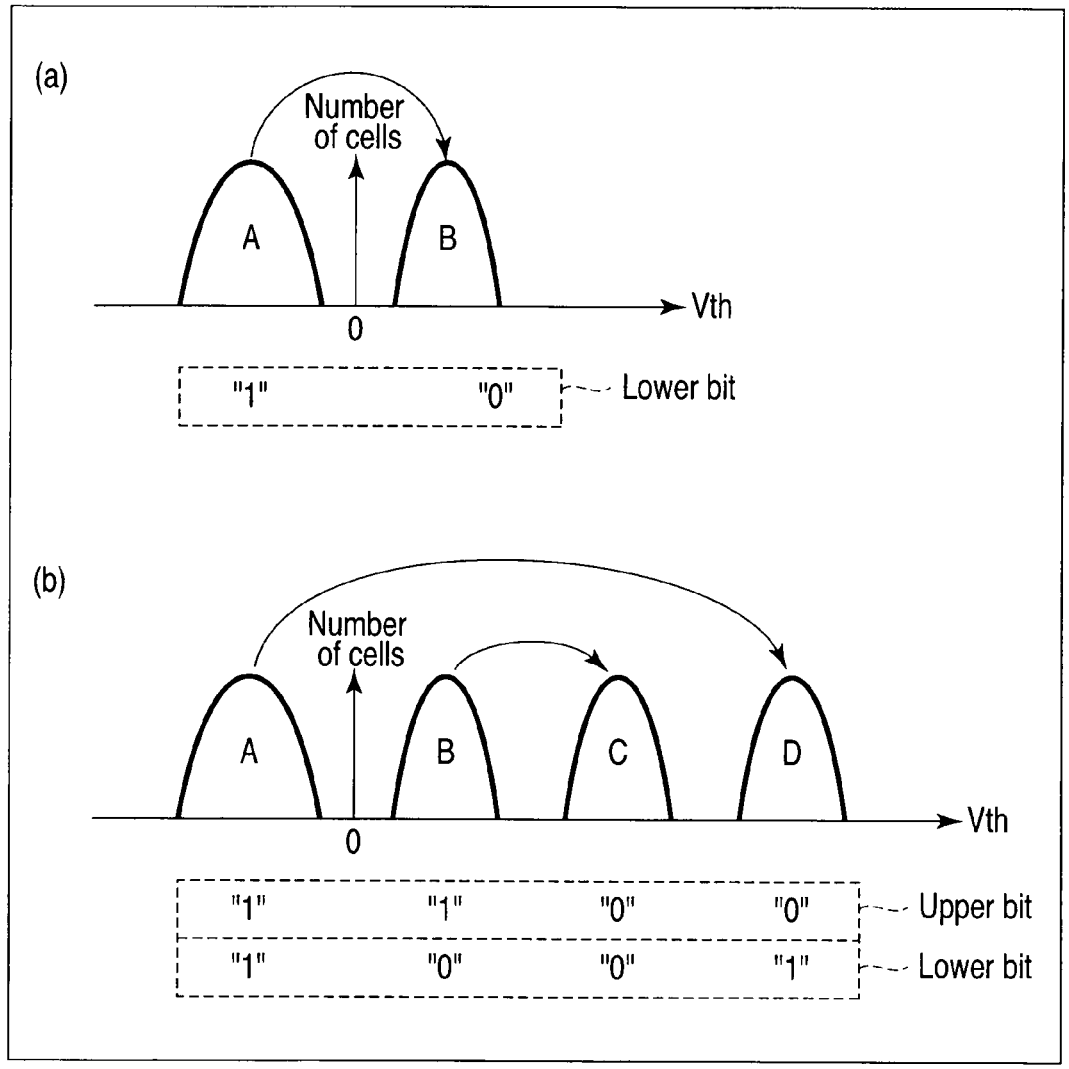
F I G. 3

| PA0 | L | PP0 |
|---|---|---|
| | — | — |
| PA1 | L | PP1 |
| | U | PP2 |
| PA2 | L | PP3 |
| | U | PP4 |
| ⋮ | ⋮ | ⋮ |
| PAj−1 | L | PP2(j−1)−1 |
| | U | PP2(j−1) |
| PAj | — | — |
| | U | PP2j−1 |

BKi

F I G. 4

| PA0 | L | PP0 |
|---|---|---|
| | — | — |
| | — | — |
| PA1 | L | PP1 |
| | M | PP2 |
| | U | PP3 |
| PA2 | L | PP4 |
| | M | PP5 |
| | U | PP6 |
| ⋮ | ⋮ | ⋮ |
| PAj−1 | L | PP3(j−1)−2 |
| | M | PP3(j−1)−1 |
| | U | PP3(j−1) |
| PAj | — | — |
| | — | — |
| | U | PP3j−2 |

BKi

F I G. 5

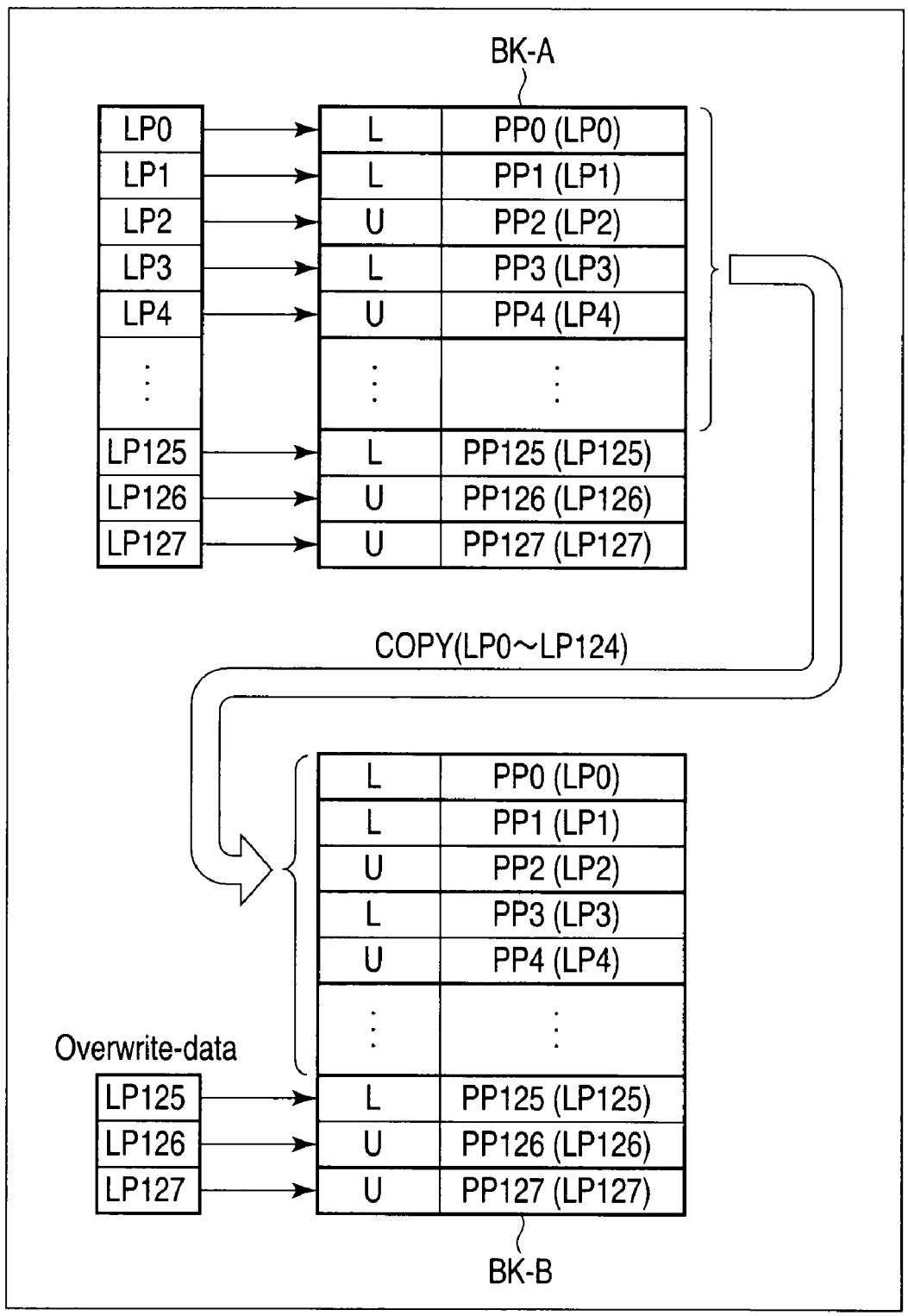
F I G. 7

FIG. 14  ⇨ Order of writing

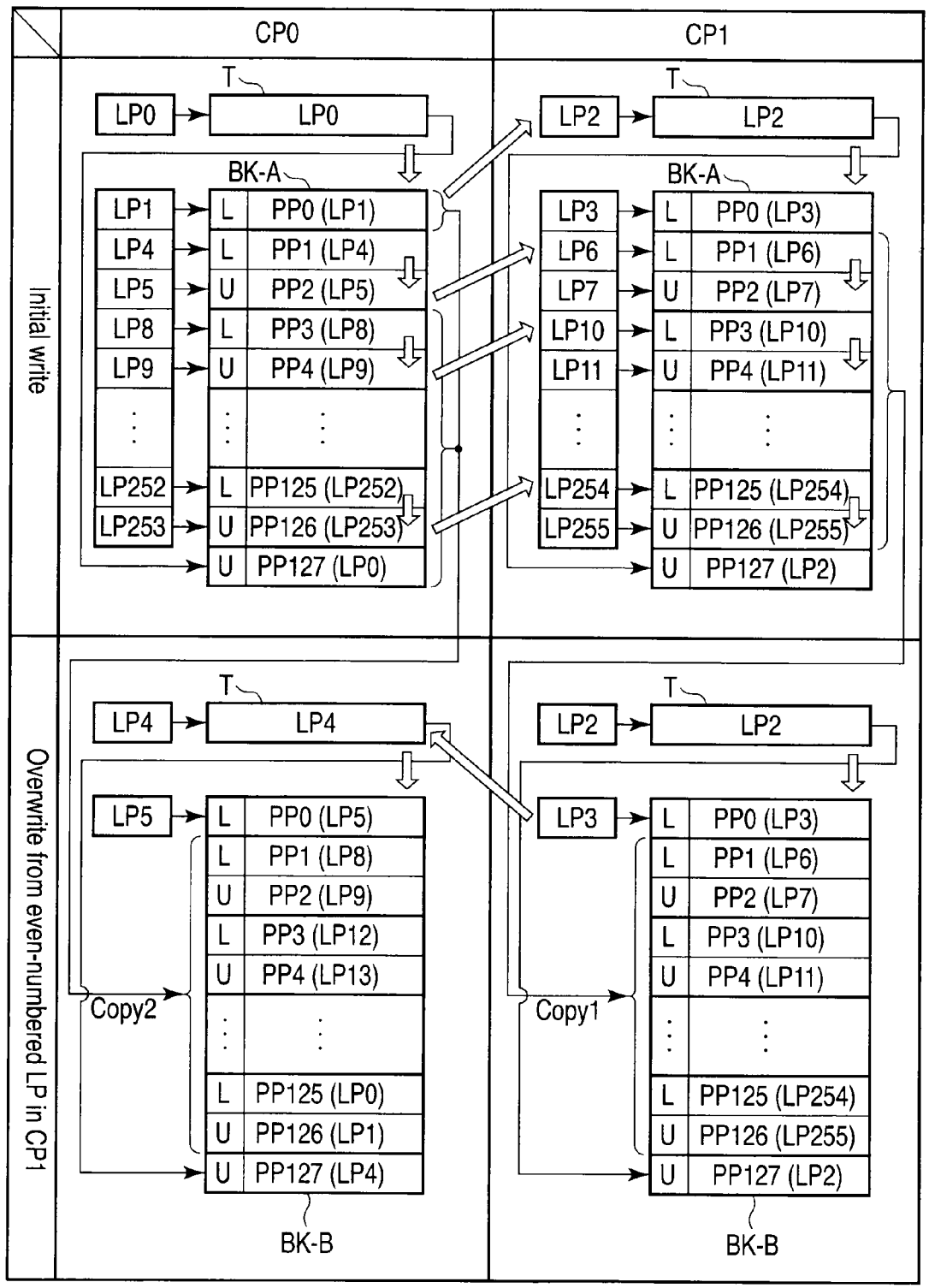
F I G. 15

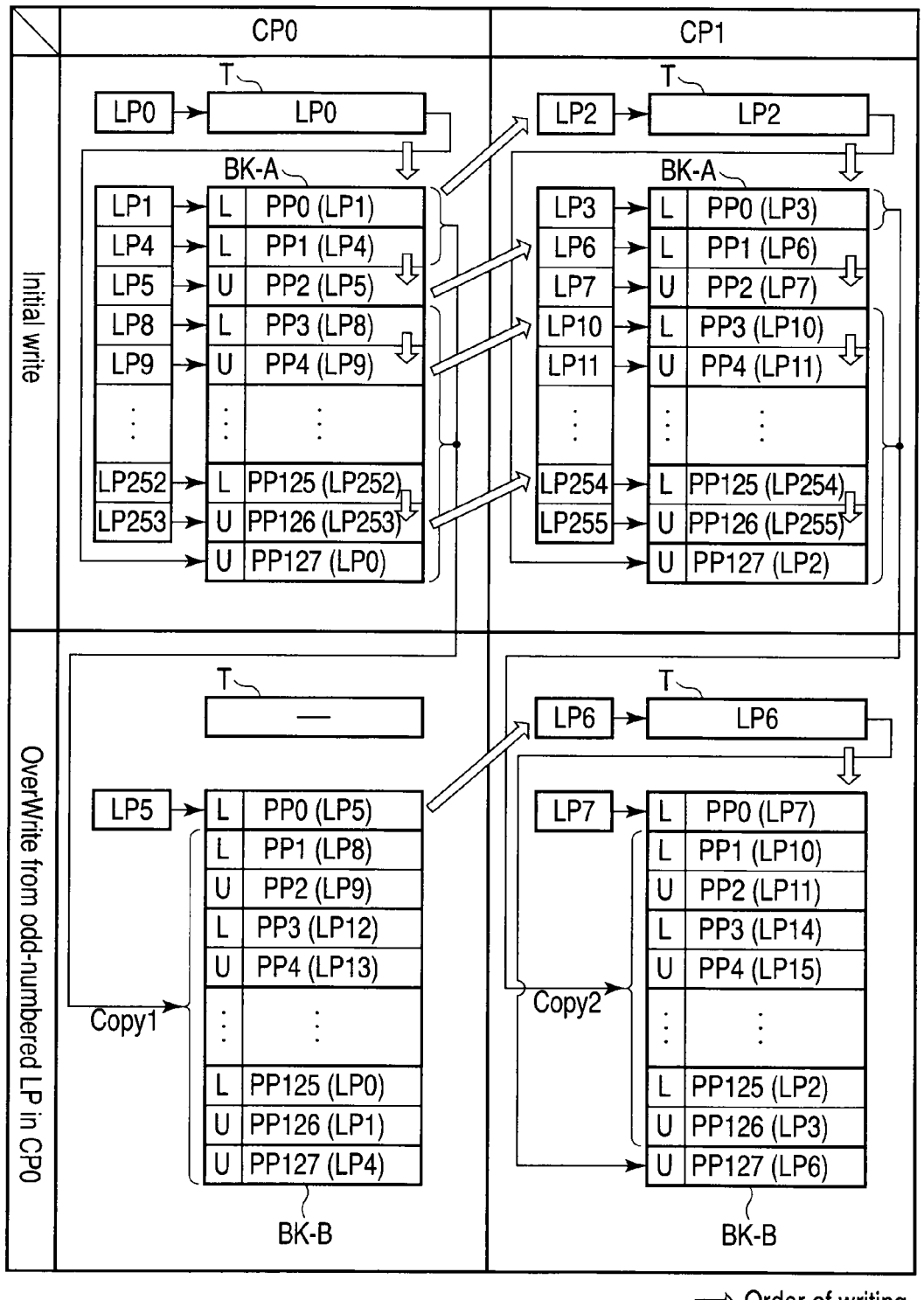
F I G. 16

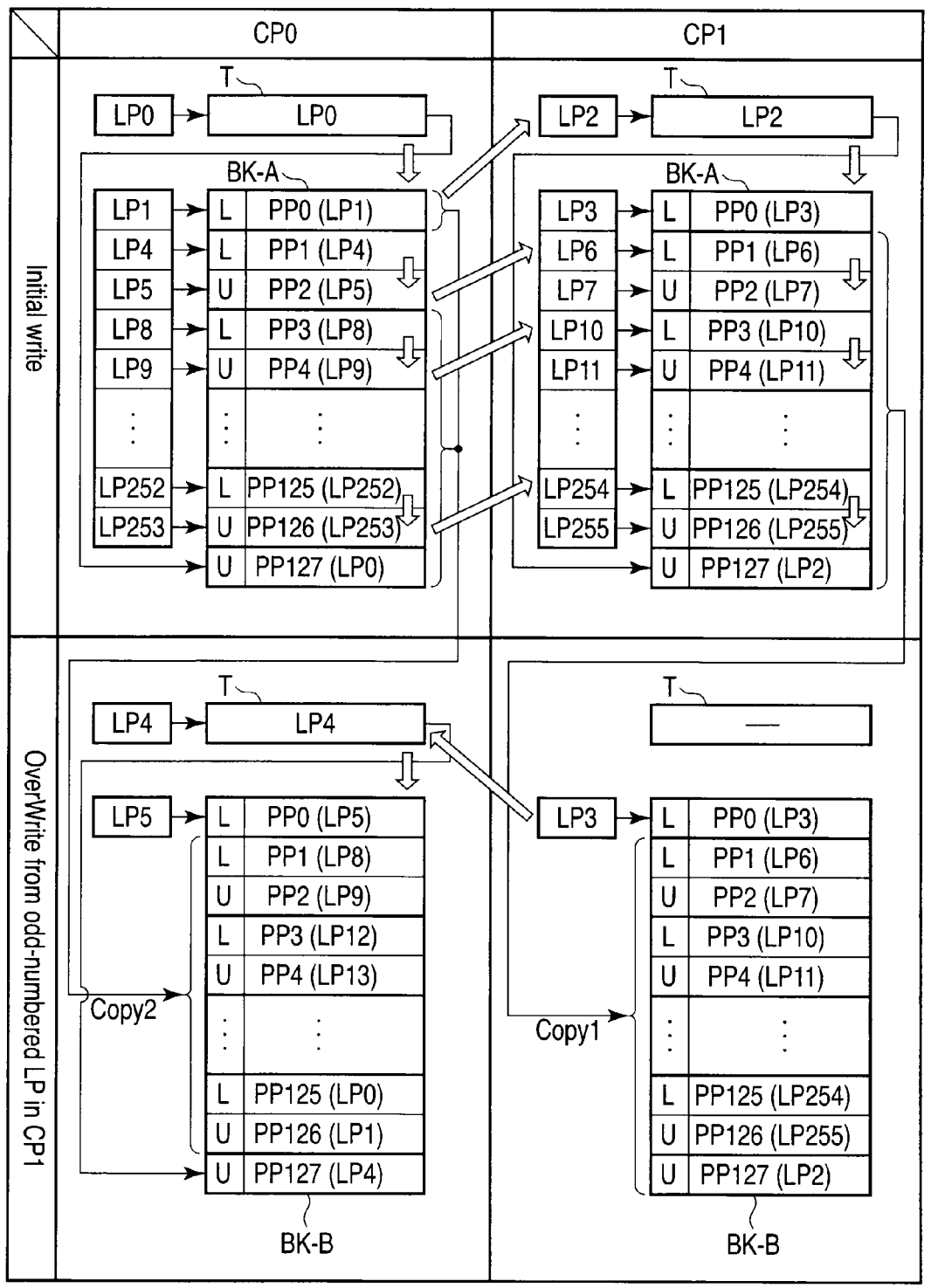
F I G. 17

BK-(T)

| L | PP0 |
|---|-----|
| L | PP1 |
| U | PP2 |
| L | PP3 |
| U | PP4 |
| ⋮ | ⋮ |
| L | |
| U | |
| U | |

F I G. 18

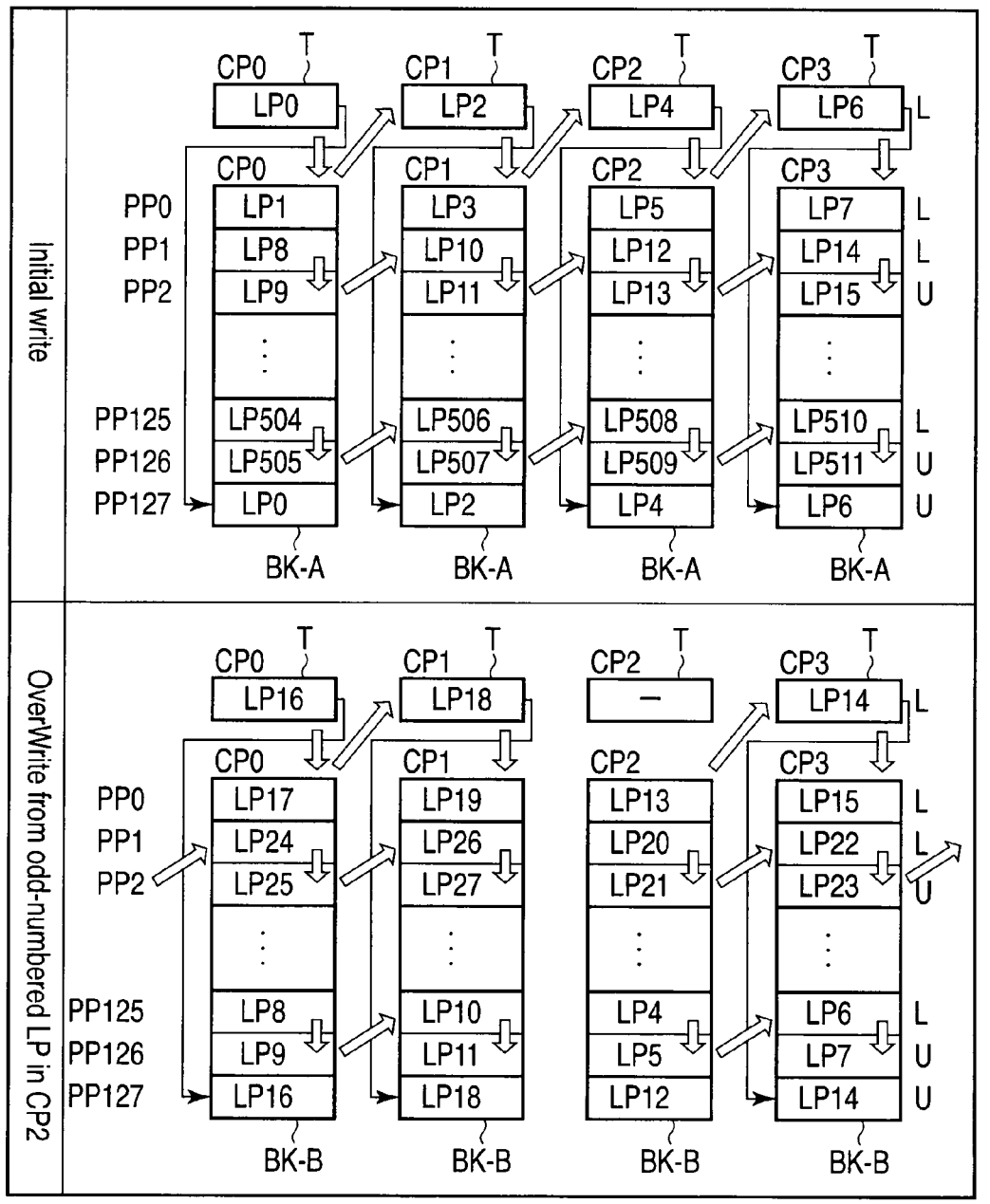
F I G. 22

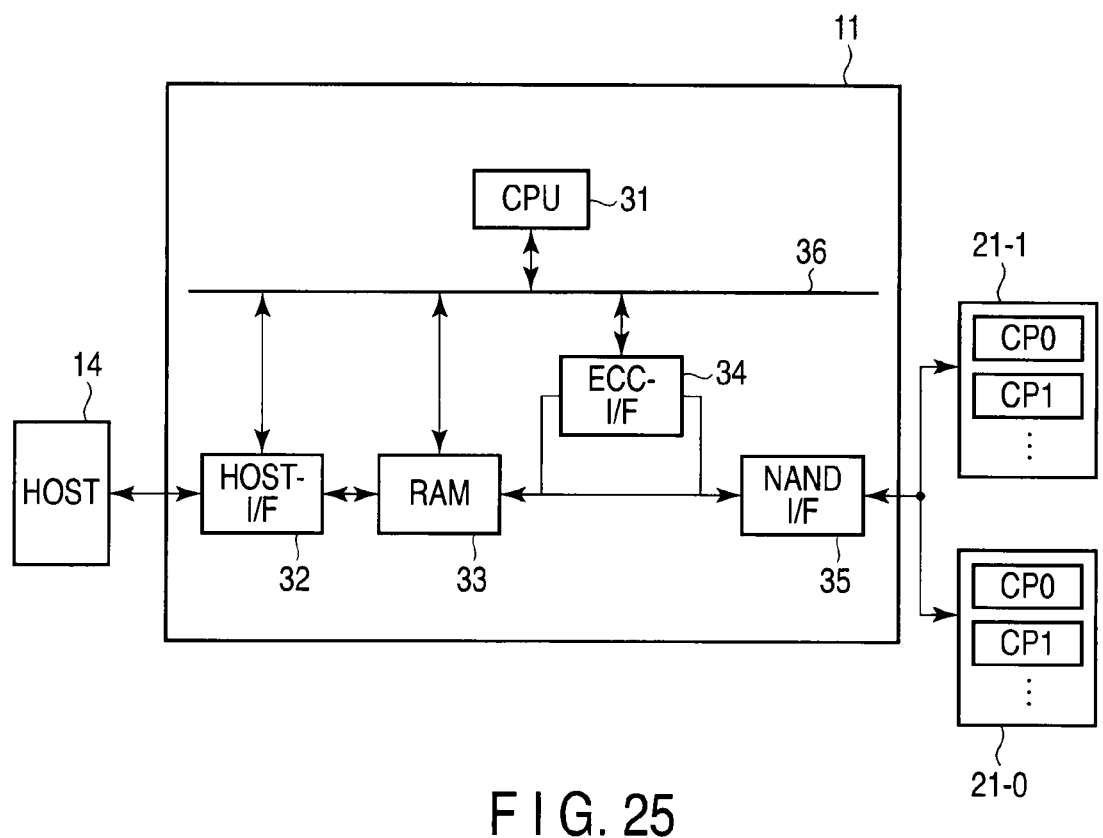
F I G. 25

MEMORY SYSTEM WHICH WRITES DATA TO MULTI-LEVEL FLASH MEMORY BY ZIGZAG INTERLEAVE OPERATION

CROSS-REFERENCE TO RELATED APPLICATIONS

This application is based upon and claims the benefit of priority from Japanese Patent Application No. 2009-207387, filed Sep. 8, 2009; the entire contents of which are incorporated herein by reference.

FIELD

Embodiments described herein relate generally to a data writing technique of a multi-level flash memory.

BACKGROUND

A flash memory, in particular, a NAND flash memory begins to be applied to various fields such as a memory card, and an SSD (solid state drive) as a storage memory. In these fields, when a flash memory system is configured, one of important problems is to increase a data writing speed.

Incidentally, an interleave operation is known as a technology for improving a data transfer speed. Accordingly, when the technology is applied to the flash memory, there is a possibility that the problem of increasing the data writing speed can be solved.

However, the flash memory has such an inherent data writing system that the flash memory cannot overwrite data to a memory cell (physical page), that is, when the flash memory overwrites data, the flash memory must withdraw an old block and rewrite the data to a new block.

Accordingly, the increase of the data writing speed is realized by developing an interleave operation that matches the data writing system of the flash memory.

BRIEF DESCRIPTION OF THE DRAWINGS

FIG. 1 shows a memory system.
FIGS. 2 and 3 show four-level threshold distributions.
FIGS. 4 and 5 show block formats.
FIG. 7 shows a conventional writing.
FIGS. 14 to 17 show embodiments.
FIG. 18 shows an example of a temporary memory.
FIGS. 19 to 22 show embodiments.
FIGS. 24 and 25 show examples of a memory controller.

DETAILED DESCRIPTION

1. Concept

Figure 2:
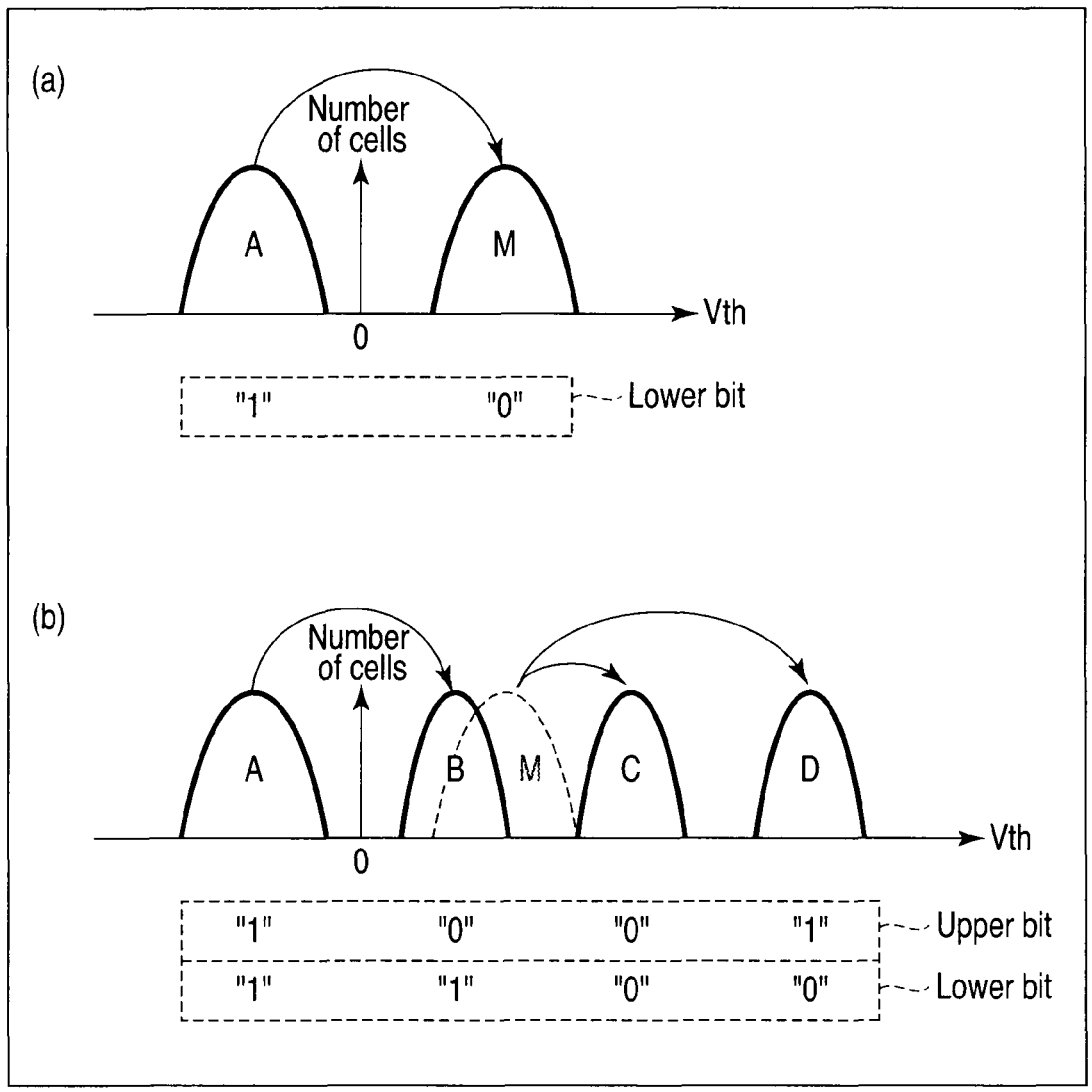

In general, according to one embodiment, a memory system includes a first memory chip comprising a first temporary memory and a first block, a second memory chip comprising a second temporary memory and a second block, and a memory controller that controls writing of logical pages to the first and second memory chips.

The first and second memory chips are each multi-level flash memories for storing n (n is a natural number of at least 2) bits in one memory cell. The first and second blocks are each configured of physical pages and the writing is executed to respective physical pages from a lowermost physical page to an uppermost physical page.

The lowermost physical page includes a lower page having a shortest write time, the uppermost physical page includes an upper page having a longest write time, and the remaining physical pages other than the lowermost physical page and the uppermost physical page are a repetition of a first unit configured of the lower page, (n–2) pieces of middle pages, and the upper page.

The memory controller forms a second unit having the same page number as the first unit by the first temporary memory and the lowermost physical page in the first block, forms a third unit having the same page number as the first unit by the second temporary memory and the lowermost physical page in the second block, and writes the logical pages by an interleave operation in order of the second unit, the third unit, the first unit in the first block, and the first unit in the second block.

Embodiments employ the following configuration to realize a high speed writing to the flash memory by the interleave operation.

First, a flash chip (memory chip) is a multi-level flash memory for storing n (n is a natural number of at least 2) bits in one memory cell. Further, the flash chip comprises blocks (memory blocks) each of which is composed of physical pages.

Here, the block means one section obtained when a memory cell array acting as a data memory area is divided into sections. Further, the page means one section obtained when the block is divided into sections. Accordingly, a page size is smaller than a block size.

Although these terms are particularly used in a NAND flash memory, they are not limited to use in the NAND flash memory.

The writing is executed to respective physical pages from a lowermost physical page to an uppermost physical page.

The lowermost physical page includes a lower page having a shortest write time, and the uppermost physical page includes an upper page having a longest write time. Remaining physical pages other than the lowermost physical page and the uppermost physical page are a repetition of a first unit composed of a lower page, (n–2) pieces of middle pages, and an upper page.

Under the premise, embodiments prepare a temporary memory for temporarily storing a logical page when the logical page is initially written and when the logical page is overwritten, respectively.

The logical page is a page designated by a host, and the physical page is a page actually designated in the flash chip.

Further, the temporary memory is, for example, a lower page having a shortest write time of a block in the flash chip, a page buffer in the flash chip, or the like.

When the logical page is written by the interleave operation, for example, a second unit having the same page number as a first unit is formed by a temporary memory in a first flash chip and a lowermost physical page of a block, a third unit having the same page number as the first unit is formed by a temporary memory in a second flash chip and a lowermost physical page of the block, and the logical page is written in order of the second unit, the third unit, a first unit in the first flash chip, and a first unit in the second flash chip.

The second unit and the third unit are a constituent employed to execute a data movement of logical pages only in the same flash chip without disturbing an order of the logical pages in the same flash chip even if a logical page is overwritten repeatedly by a page shift operation from any of the logical pages.

In, for example, a 4-level, a logical page is written to a new block by the interleave operation in the following order using two logical pages in pairs.

A. Second unit (2 pages) in first flash chip
  temporary memory→lowermost physical page (lower page)
B. Third unit (2 pages) in second flash chip
  temporary memory→lowermost physical page (lower page)
C. First unit (2 pages) in first flash chip
  lower page→upper page
D. First unit (2 pages) in second flash chip
  lower page→upper page
E. Repetition of C. and D.
F. Copy of logical page written to temporary memory A logical page written to a temporary memory in a first flash memory is copied to an uppermost physical page (upper page) of a new block in the first flash memory, and a logical page written to a temporary memory in a second flash memory is copied to an uppermost physical page (upper page) of a new block in the second flash memory.

However, when a logical page is overwritten to a new block from upper pages in an old block, the writing to the temporary memory in A. described above is omitted, and the writing starts from the lowermost physical page (lower page) in A. described above.

At this time, in F. described above, only the logical page written to the temporary memory in the second flash memory is copied.

Note that the copy executed in F. described above is most preferably executed when an old block is withdrawn.

Further, in an n-level, a logical page is written to a new block by the interleave operation in the following order using n pieces of logical pages in pairs.

A. Second unit (n pages) in first flash chip
  temporary memory→lowermost physical page (lower page→(n−2) pieces of middle pages)
B. Third unit (n pages) in second flash chip
  temporary memory→lowermost physical page (lower page→(n−2) pieces of middle pages)
C. First unit (n pages) in first flash chip
  lower page→(n−2) pieces of middle pages→upper page
D. First unit (n pages) in second flash chip
  lower page→(n−2) pieces of middle pages→upper page
E. Repetition of C. and D.
F. Copy of logical page written to temporary memory A logical page written to a temporary memory in a first flash memory is copied to an upper page in an uppermost physical page of a new block in the first flash memory, and a logical page written to a temporary memory in a second flash memory is copied to an upper page in an uppermost physical page of a new block in the second flash memory.

However, when the logical page is overwritten to a new block from (n−2) pieces of middle pages or from an upper page in an old block, the writing to the temporary memory in A. described above is omitted, and the writing starts from a lower page in the lowermost physical page in A. described above.

At this time, in F. described above, only the logical page written to the temporary memory in the second flash memory is copied.

Note that the copy in F. described above is most preferably executed when an old block is withdrawn.

Further, in the n-level, the logical page may be written to the new block by the interleave operation in the following order.

A. Second unit (n pages) in first flash chip
  temporary memory (n−1 pages)→lowermost physical page (lower page)
B. Third unit (n pages) in second flash chip
  temporary memory (n−1 pages)→lowermost physical page (lower page)
C. First unit (n pages) in first flash chip
  lower page→(n−2) pieces of middle pages→upper page
D. First unit (n pages) in second flash chip
  lower page→(n−2) pieces of middle pages→upper page
E. Repetition of C. and D.
F. Copy of logical page written to temporary memory Note that the copy in F. described above is most preferably executed when an old block is withdrawn.

According to the configuration described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when an old block is withdrawn, since the data of the logical page moves only in the same flash chip, a high speed writing can be realized by reducing a withdrawal time making use of a high speed moving function of data between blocks mounted on the flash chip.

2. Flash Memory System

FIG. 1 shows a flash memory system.

Flash chips CP0, CP1 are chips in which, for example, NAND flash memories are formed.

Flash chips CP0, CP1 are composed of m+1 pieces (m is a natural number) of blocks BK0, BK1, ... BKm. Block BKi (i=0, 1, ... m) is composed of pages.

Memory controller 11 controls a data writing operation to flash chips CP0, CP1.

Although two pieces of flash chips CP0, CP1 are used in the example, three or more pieces of flash chips CP0, CP1 may be used.

Further, memory controller 11 and flash chips CP0, CP1 may be accommodated in one package, and a package in which flash chip CP0 is accommodated may be different from a package in which flash chip CP1 is accommodated.

3. Multi-Level Flash Memory

Embodiments relate to a data writing technology to a multi-level flash memory.

A multi-level means that at least 3-level data is stored in one memory cell. Since 1 bit, which is a unit of data, has a 2-level, the multi-level flash memory ordinarily has a $2^n$ level (n is a natural number). It is assumed that when n-bits are stored in one memory cell, the n-bits are shown by a lower bit, middle bits, and an upper bit.

In a multi-level NAND flash memory, data is written in units of page. In this case, a lower bit as write data is called lower page L, middle bits are called middle pages M, and an upper bit is called upper page U.

For example, as shown in FIG. 2, 4-level (2 bits) is stored in one memory cell in a 4-level NAND flash memory. At this time, the 2 bits stored in the one memory cell are shown by a lower bit and an upper bit.

In a state that only the lower bit is stored in the one memory cell, a threshold value distribution of the memory cell is one of first state A and second state M. First state A is an erase state, and second state M is called an LM (lower middle) state.

In a state that the lower bit and the upper bit are stored in the one memory cell, the threshold value distribution of the memory cell is one of first state A, third state B, fourth state C, and fifth state D. For example, third state B can be obtained by a threshold value shift from first state A, and fourth and fifth states C, D can be obtained by the threshold value shift from second state M.

However, a threshold value shift method is not limited to the above method.

As shown in, for example, FIG. 3, in the state that only the lower bit is stored, the threshold value distribution of the memory cell may be one of first state A and second state B, and in the state that the lower bit and the upper bit are stored, the threshold value distribution of the memory cell may be one of first state A, second state B, third state C, and the fourth state D.

In this case, third state C can be obtained by the threshold value shift from second state B, and fourth state D can be obtained by the threshold value shift from first state A.

4. Block Format of Flash Memory

A block format of a flash memory will be explained.

FIGS. 4 and 5 show the block format of the flash memory.

Block BKi (i=0, 1, ... m) corresponds to blocks BK0, BK1, ... BKm of FIG. 1.

FIG. 4 shows a block format of a 4-level flash memory.

One block BKi is composed of j+1 pieces (j is a natural number) of physical addresses PA0, PA1, PA2, ... PAj-1, PAj.

Lowermost physical address PA0 in one block BKi is composed only of one page of physical page PP0. Physical page PP0 is set to, for example, lower page L.

Further, uppermost physical address PAj in one block BKi is composed only of one page of physical page PP2$j$-1. Physical page PP2$j$-1 is set to, for example, upper page U.

Whether physical pages PP0, PP2$j$-1 are set to the lower page or to the upper page is arbitrarily determined.

Remaining physical addresses PA1, PA2, ... PAj-1 are composed of two pages of lower page L and upper page U.

For example, physical address PA1 is composed of physical page PP1 as lower page L and physical page PP2 as upper page U.

FIG. 5 shows a block format of an 8-level flash memory.

One block BKi is composed of j+1 pieces (j is a natural number) of physical addresses PA0, PA1, PA2, ... PAj-1, PAj.

Lowermost physical address PA0 in one block BKi is composed only of one page of physical page PP0. Physical page PP0 is set to, for example, lower page L.

Further, uppermost physical address PAj in one block BKi is composed only of one page of physical page PP2$j$-1. Physical page PP2$j$-1 is set to, for example, upper page U.

Whether physical pages PP0, PP2$j$-1 are set to the lower page or to the upper page is arbitrarily determined.

Each of remaining physical addresses PA1, PA2, ... PAj-1 is composed of 3 pages of lower page L, middle page M, and upper page U.

For example, physical address PA1 is composed of physical page PP1 as lower page L, physical page PP2 as middle page M, and physical page PP3 as upper page U.

Note that lowermost physical address PA0 in one block BKi may be composed of two pages of lower page L and middle page M. Further, uppermost physical address PAj in one block BKi may be composed two pages of middle page M and upper page U.

Figure 6:
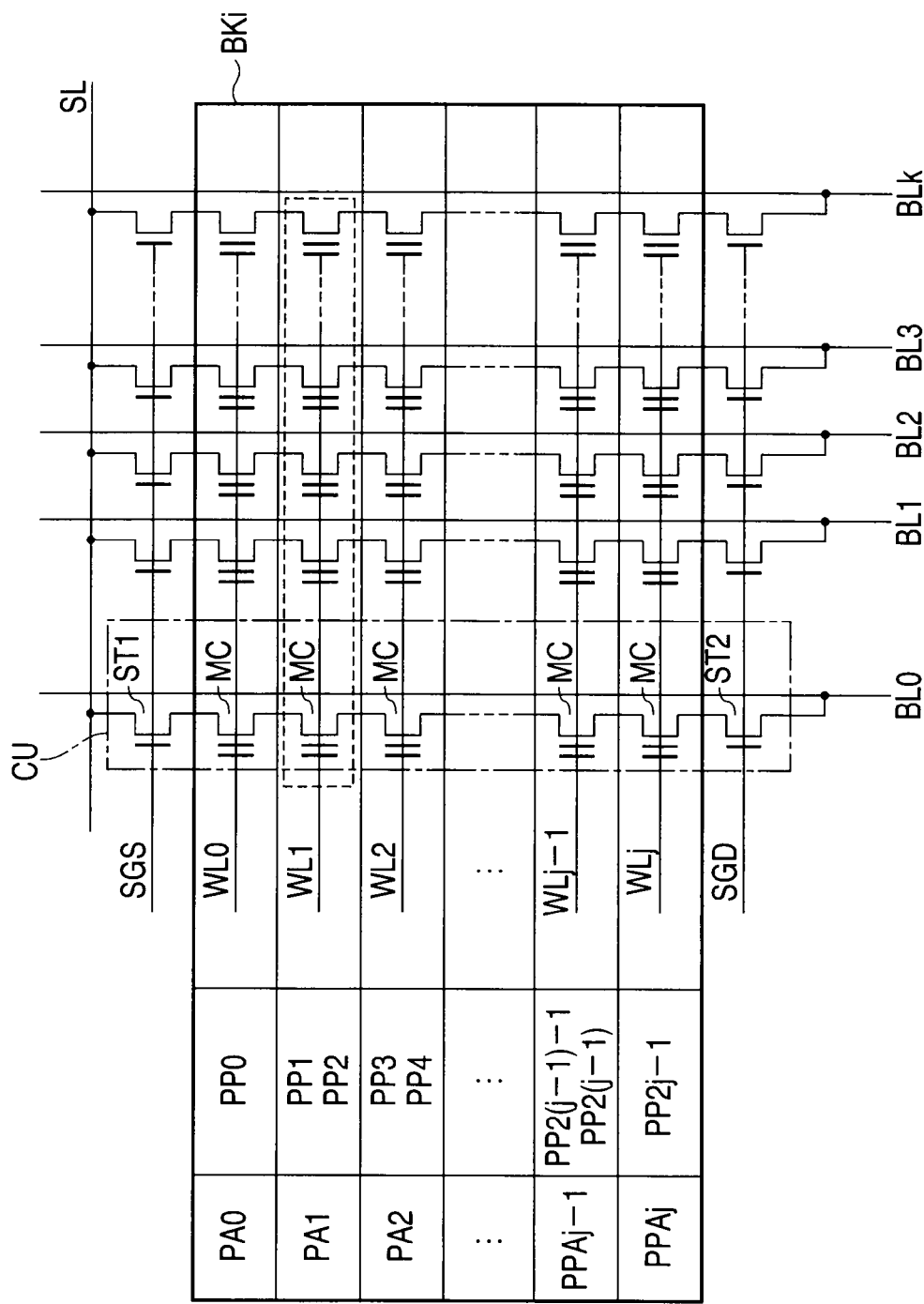
FIG. 6 shows a NAND block.

FIG. 6 shows a block format of a NAND flash memory.

An example of a 4-level will be explained here in correspondence to the block format of FIG. 4.

NAND cell unit CU is composed of j+1 pieces of memory cells MC connected in series and two select gate transistors ST1, ST2 in total connected to both the ends of memory cells MC. Select gate transistor ST1 is connected to source line SL, and select gate transistor ST2 is connected to bit line BL0.

Word lines WL0, WL1, WL2, ... WLj-1, WLj are connected to memory cells MC and select gate lines SGS, SGD are connected to select gate transistors ST1, ST2.

One block BKi is composed of j+1 pieces (j is a natural number) of physical addresses PA0, PA1, PA2, ... PAj-1, PAj.

Lowermost physical address PA0 in one block BKi is composed only of one page of physical page (lower page) PP0.

Further, uppermost physical address PAj in one block BKi is composed only of one physical page (upper page) PP2$j$-1.

Each of remaining physical addresses PA1, PA2, PAj-1 is composed of two pages of lower page L and upper page U.

Although the block formats of the 4-level (2 bits) and the 8-level (3 bits) have been explained above, the block formats can be easily applied to a 16-level (4 bits), a 32-level (5 bits), a 64-level (6 bits) ... by increasing, for example, the number of middle bits M of FIG. 5.

A feature of the block formats of these flash memories is that a page configuration (only one page) of lowermost physical address PA0 in one block BKi is different from page configurations (pages) of physical addresses PA1, PA2, ... PAj-1.

This is a factor for preventing a high speed writing when a page shift operation and a zigzag interleave operation to be explained below are executed.

5. Page Shift Operation

A page shift operation is one of technologies developed to realize a high speed writing in a flash memory.

Since Embodiments employ the page shift operation as a premise, the page shift operation will be explained.

A flash memory, for example, erases data in units of block and writes data in units of page. In contrast, data is managed in a size smaller than a page size, for example, in a sector.

When new data is written to the flash memory, new data, which is managed in units of sector, can be sequentially written to, for example, a non-used block (new block) from which data has been erased from a lowermost physical page to an uppermost physical page in units of page.

In contrast, when a part (for example, a sector) of a page in a block being used (old block) to which data is written is changed by overwriting data, since only a part of the page to which the data is overwritten cannot be changed, a non-used block (new block) from which data has been erased, for example, is newly prepared, and the overwriting data is written to the non-used block.

Figure 8:
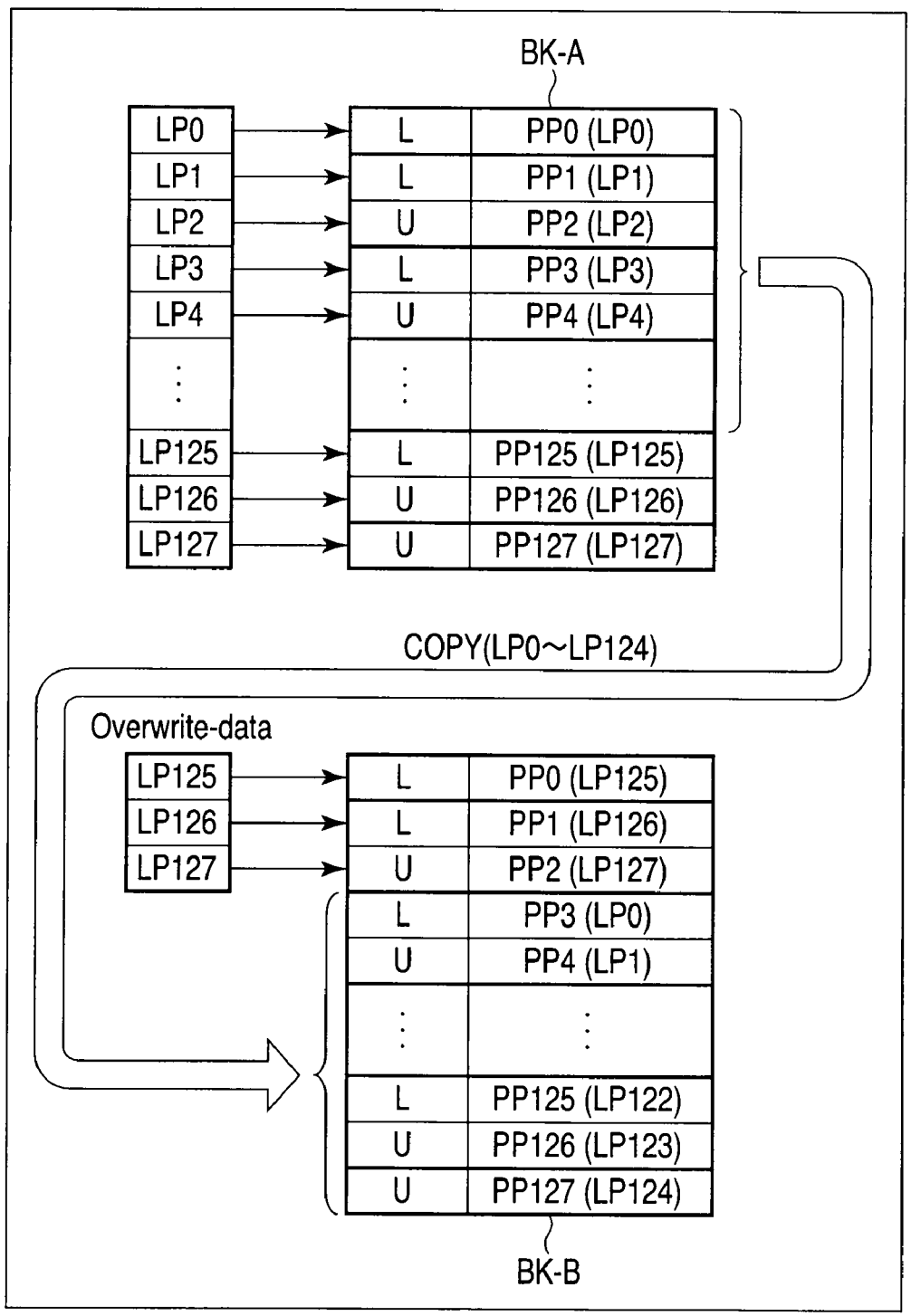
FIG. 8 shows a writing by a page sift operation.

FIGS. 7 and 8 show examples of an overwrite operation.

In the examples, it is assumed that one block is composed of 128 pages.

First, the new data of logical pages LP0, LP1, LP2, LP3, LP4, ... LP125, LP126, LP127 are sequentially written to physical pages PP0, PP1, PP2, PP3, PP4, ... PP125, PP126, PP127 of non-used block BK-A in units of page. Block BK-A, to which the data has been written, becomes a block being used.

Thereafter, a case that the overwrite is executed to logical pages LP125, LP126, LP127 will be examined. In this case, first, non-used block BK-B is prepared independently of block BK-A being used.

Data are sequentially written to non-used block BK-B from physical page PP0 to physical page PP127 in units of page.

Accordingly, in the example of FIG. 7, after data (effective data) of physical pages PP0 to PP124 in block BK-A being used are copied to non-used block BK-B, the data of logical pages LP125 to LP127 as overwriting data are written to physical pages PP125 to PP127 of non-used block BK-B.

However, during the control, since data must be copied from block BK-A being used to non-used block BK-B at all times before the data are overwritten, a data writing speed cannot be increased.

In contrast, in the example of FIG. 8, overwriting data is sequentially written at all times from lowermost physical page PP0 of non-used block BK-B. Specifically, the data of logical pages LP125 to LP127 as overwriting data are written to physical pages PP0 to PP2 of non-used block BK-B.

The control is called the page shift operation.

According to the page shift operation, when a part of the page in block BK-A being used is changed by the overwriting data, since the data in block BK-A being used need not be copied to non-used block BK-B, the data writing speed can be increased.

However, in the page shift operation, it is important to manage a relation between a logical page and a physical page by the controller.

The remaining effective data in block BK-A, that is, the data of logical pages LP0 to LP124 are moved from, for example, physical pages PP0 to PP124 in block BK-A to physical pages PP3 to PP127 in block BK-B at an appropriate time.

After the effective data in block BK-A are moved, block BK-A has only ineffective data. Accordingly, when data is erased from block BK-A, block BK-A is treated as a non-used block again.

When a block being used returns to a non-used block again as described above, it is called "withdrawal".

6. Zigzag Interleave Operation

A zigzag interleave operation is also one of the technologies developed to realize a high speed writing in a flash memory.

Since Embodiments employ the zigzag interleave operation as a premise, the zigzag interleave operation will be explained. Zigzag is named after the fact that when data is written to physical pages of chips in a zigzag order at the time an interleave operation is applied to data writing to a multi-level flash memory, the zigzag order can contribute to a high speed writing.

(1) Normal Interleave Operation

To understand the zigzag interleave operation, first, one must know a normal interleave operation, which will be explained below.

Figure 9:
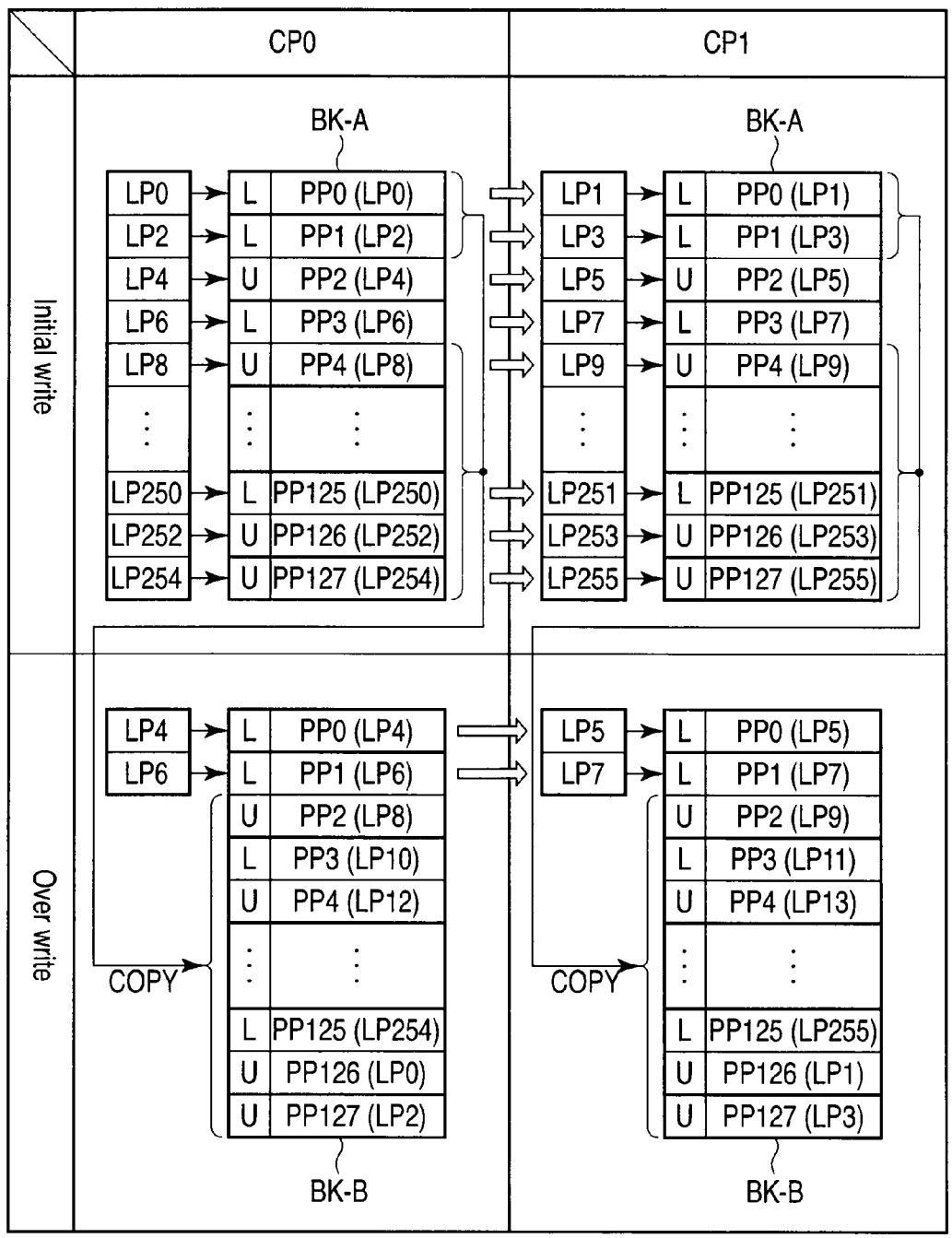
FIG. 9 shows a writing by an interleave operation.

FIG. 9 shows a writing procedure of the normal interleave operation.

It is assumed here that the number of chips to be interleaved is set to 2 and one block is composed of 128 pages.

In an initial write, the new data of logical pages LP0, LP1, LP2, LP3, LP4, . . . LP125, LP126, LP127 are sequentially and alternately written to physical pages PP0, PP1, PP2, PP3, PP4, . . . PP125, PP126, PP127 of non-used blocks BK-A in two flash chips CP0, CP1 in units of page.

For example, first, the data of logical page LP0 is written to physical page PP0 (lower page L) of non-used block BK-A of flash chip CP0. Next, the data of logical page LP1 is written to physical page PP0 (lower page L) of non-used block BK-A of flash chip CP1.

Subsequently, the data of logical page LP2 is written to physical page PP1 (lower page L) of non-used block BK-A of flash chip CP0. Next, the data of logical page LP3 is written to physical page PP1 (lower page L) of non-used block BK-A of flash chip CP1.

Thereafter, the data of logical pages LP4, LP5, . . . LP254, LP255 are sequentially written likewise.

Blocks BK-A, to which the data have been written, become blocks being used.

Thereafter, a case that the overwrite is executed to logical pages LP4, LP5, LP6, LP7 will be examined. In this case, first, non-used blocks BK-B are prepared independently of blocks BK-A being used.

It is assumed here that data are sequentially written to non-used blocks BK-B from physical page PP0 to physical page PP127 in units of page by the page shift operation described above.

That is, in the overwrite operation, the data of logical pages LP4, LP5, LP6, LP7 are alternately written to physical pages PP0, PP1 of non-used blocks BK-B in two flash chips CP0, CP1.

Specifically, first, the data of logical page LP4 is written to physical page PP0 (lower page L) of non-used block BK-B of flash chip CP0. Next, the data of logical page LP5 is written to physical page PP0 (lower page L) of non-used block BK-B of flash chip CP1.

Subsequently, the data of logical page LP6 is written to physical page PP1 (lower page L) of non-used block BK-B of flash chip CP0. Next, the data of logical page LP7 is written to physical page PP1 (lower page L) of non-used block BK-B of flash chip CP1.

Then, the remaining effective data in blocks BK-A, that is, the data of logical pages LP0 to LP3 and LP8 to LP255 are moved from, for example, physical pages PP0, PP1 and PP4 to PP127 in blocks BK-A to physical pages PP2 to PP127 in blocks BK-B at an appropriate time.

Figure 10:
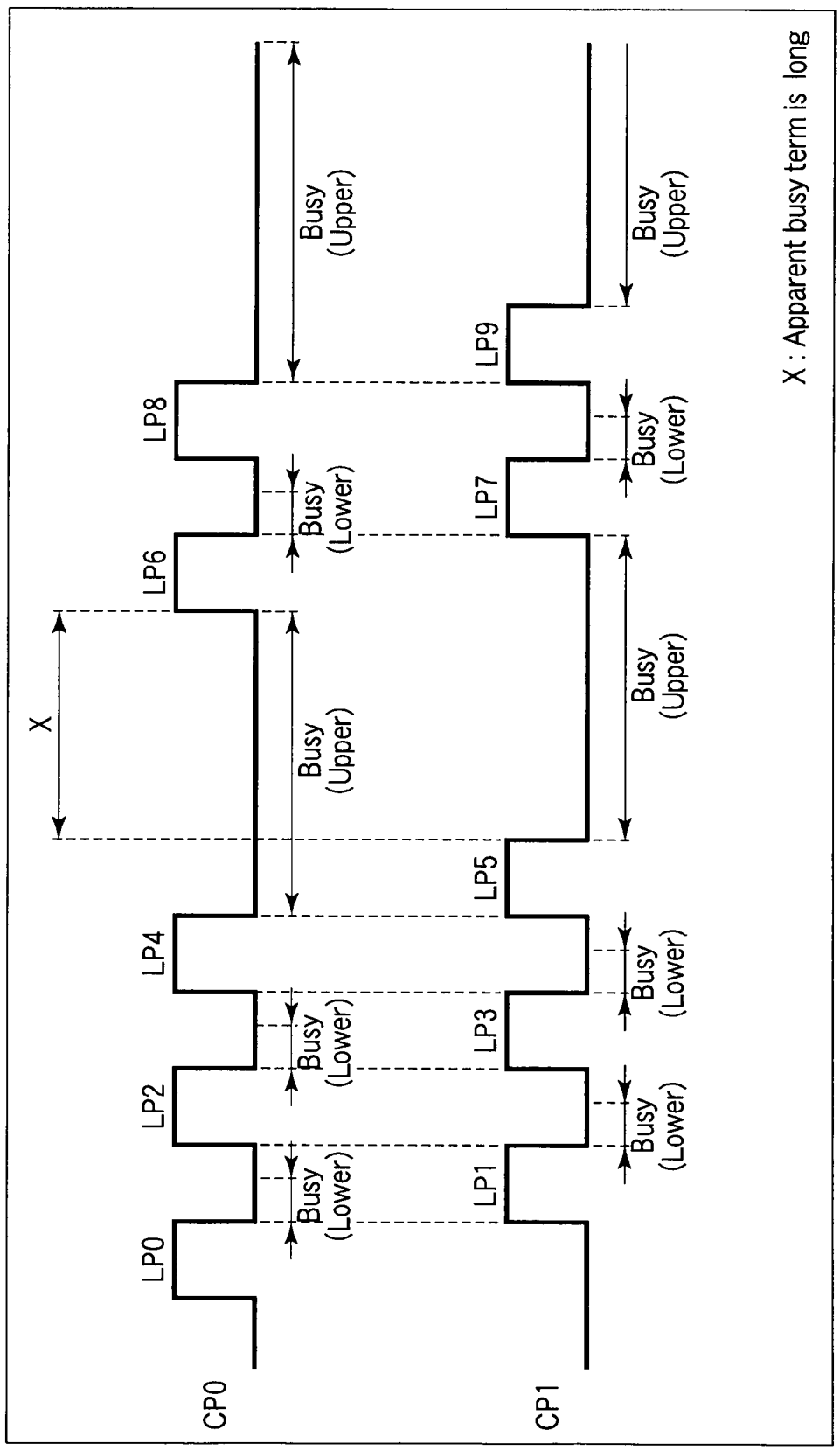
FIG. 10 shows a wave form chart of an operation in FIG. 9.

FIG. 10 shows an operation waveform of a normal interleave.

In the normal interleave operation, since data is alternately input to, for example, two flash chips CP0, CP1, the data can be written to two flash chips CP0, CP1 substantially in parallel. As a result, an apparent writing speed can be improved.

However, since the interleave does not effectively function due to the block format inherent to the flash memory described above, it is difficult to greatly improve the writing speed.

This is because, in the multi-level flash memory, a lower page, middle pages, and an upper page have different write times, respectively. For example, the lower page has a shortest write time and the upper page has a longest write time.

That is, in the normal interleave operation, a lower page is input to flash chip CP1 while a lower page is being written to flash chip CP0, an upper page is input to flash chip CP0 while a lower page is being written to flash chip CP1, and an upper page is input to flash chip CP1 while an upper page is being written to flash chip CP0.

In this case, since the lower page has the short write time, it is not preferable to input the data of logical page LP3 to flash chip CP1 while, for example, logical page LP2 is being written to flash chip CP0 (Busy period).

Further, since the upper page has the long write time, it is not effective to input only the data of logical page LP5 to flash chip CP1 while, for example, an upper page of logical page LP4 is being written to flash chip CP0 (Busy period).

In the example, since apparent Busy period X caused by writing logical page LP4 becomes long, an effect of the high speed writing executed by the interleave is restricted.

(2) Zigzag Interleave Operation

The zigzag interleave operation overcomes the problem of the normal interleave operation. A feature of the zigzag interleave operation is to write a lower page and an upper page in pairs.

Figure 11:
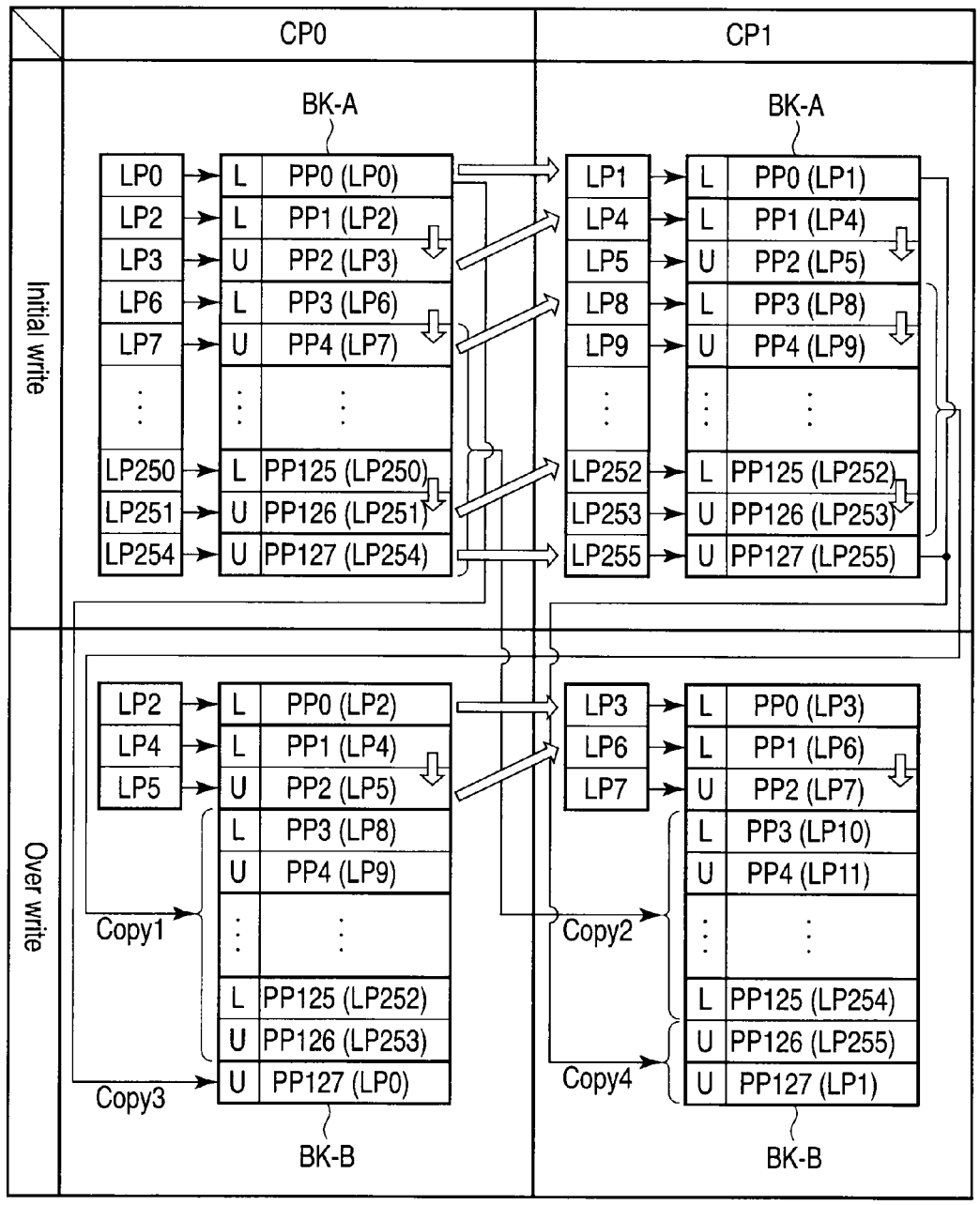
FIG. 11 shows a writing by a zigzag interleave operation.

FIG. 11 shows a writing procedure of the zigzag interleave operation.

It is assumed here that the number of chips to be interleaved is set to 2 and one block is composed of 128 pages.

In an initial write, the new data of logical pages LP0, LP1, LP2, LP3, LP4, . . . LP125, LP126, LP127 are sequentially written zigzag in units of page to physical pages PP0, PP1, PP2, PP3, PP4, . . . PP125, PP126, PP127 of non-used blocks BK-A in two flash chips CP0, CP1.

For example, first, the data of logical page LP0 is written to physical page PP0 (lower page L) of non-used block BK-A of flash chip CP0. Next, the data of logical page LP1 is written to physical page PP0 (lower page L) of non-used block BK-A of flash chip CP1.

Subsequently, the data of logical pages LP2, LP3 are written to physical pages PP1 (lower page L) and PP2 (upper page) of non-used block BK-A of flash chip CP0. Next, the data of logical pages LP4, LP5 are written to physical pages PP1 (lower page L) and PP2 (upper page) of non-used block BK-A of flash chip CP1.

Thereafter, the data of logical pages LP6, LP7, . . . LP254, LP255 are sequentially written likewise.

Blocks BK-A, to which the data have been written, become blocks being used.

Thereafter, a case that the overwrite is executed to logical pages LP2 to LP7 will be examined. In this case, first, non-used blocks BK-B are prepared independently of blocks BK-A being used.

It is assumed here that data are sequentially written to non-used blocks BK-B from physical page PP0 to physical page PP127 in units of page by the page shift operation described above.

That is, in the overwrite operation, the data of logical pages LP2 to LP7 are written zigzag to physical pages PP0, PP1 of non-used blocks BK-B in two flash chips CP0, CP1.

Specifically, first, the data of logical page LP2 is written to physical page PP0 (lower page L) of non-used block BK-B of flash chip CP0. Next, the data of logical page LP3 is written to physical page PP0 (lower page L) of non-used block BK-B of flash chip CP1.

Subsequently, the data of logical pages LP4, LP5 are written to physical pages PP1 (lower page L) and PP2 (upper page U) of non-used block BK-B of flash chip CP0. Next, the data of logical pages LP6, LP7 are written to physical pages PP1 (lower page L) and PP2 (upper page U) of non-used block BK-B of flash chip CP1.

Then, the remaining effective data in blocks BK-A, that is, the data of logical pages LP0, LP1, LP8 to LP255 are moved from, for example, physical pages PP0, PP3 to PP127 in blocks BK-A to physical pages PP3 to PP127 in blocks BK-B at an appropriate time.

Figure 12:
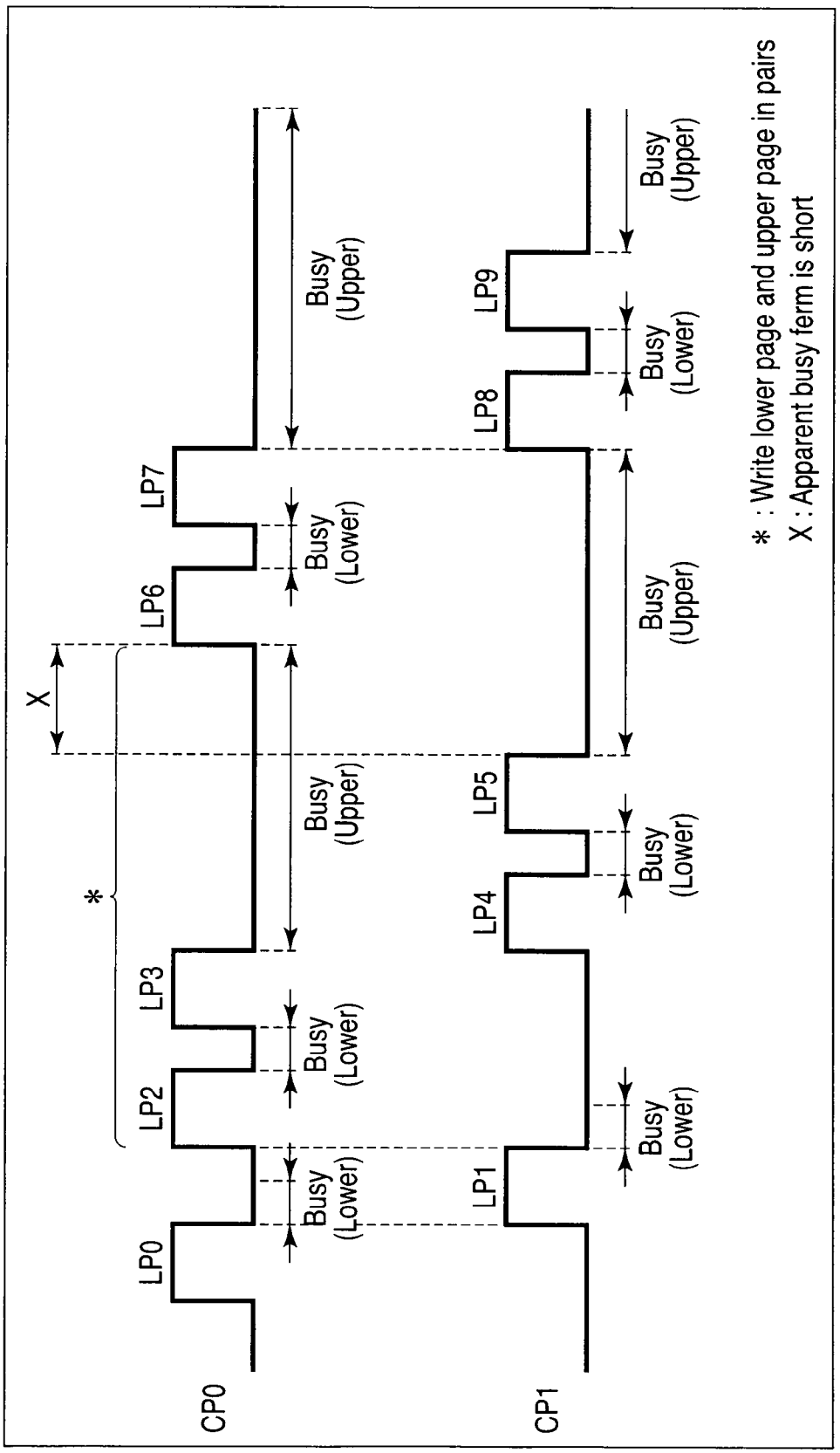
FIG. 12 shows a wave form chart of an operation in FIG. 11.

FIG. 12 shows an operation waveform of a zigzag interleave.

In the zigzag interleave operation, since data is input zigzag to, for example, two flash chips CP0, CP1, the data can be written to two flash chips CP0, CP1 substantially in parallel. As a result, an apparent writing speed can be improved.

Further, since the writing is continuously executed using a lower page and an upper page in pairs, the lower page and the upper page are input to the remaining one flash chip or flash chips making use of a Busy period caused by writing the upper page of one flash chip at all times.

For example, the data of logical pages LP4, LP5 are input to flash chip CP1 while the upper page of logical page LP3 is written to flash chip CP0 (Busy period).

Accordingly, since apparent Busy period X, which is caused by writing logical page LP3, becomes short, an effect of the high speed writing achieved by the interleave is maximized.

The maximum effect is realized by setting the number of flash chips as targets of a zigzag interleave to an optimum value based on the Busy period during which the upper page is written.

The zigzag interleave operation has been described above. A feature of the zigzag interleave operation is that when an interleave writing is executed to flash chips, the writing is executed using a lower page and an upper page in pairs and the lower page and the upper page are input making use of the Busy period caused by writing the upper page.

Accordingly, it is important not to disturb the write order.

However, there is a mode in which the interleave does not effectively function even by the zigzag interleave operation due to the block format inherent to the flash memory described above.

The mode occurs in overwrite.

(3) Problem of Zigzag Interleave Operation

A problem of the zigzag interleave operation occurs when data is overwritten by the page shift operation.

As described above, the feature of the zigzag interleave operation is to continuously write a lower page and an upper page in pairs when the interleave writing is executed to flash chips.

Accordingly, overwriting data must be written by the page shift operation without disturbing the write order.

In an example of FIG. 11, overwrite is executed to logical page LP2 to LP7.

The data of logical page LP2 is written to physical page PP0 (lower page L) of non-used block BK-B of flash chip CP0, and the data of logical page LP3 is written to physical page PP0 (lower page L) of non-used block BK-B of flash chip CP1.

Further, the data of logical pages LP4, LP5 are written to physical pages PP1 (lower page L) and PP2 (upper page U) of non-used block BK-B of flash chip CP0, and the data of logical pages LP6, LP7 are written to physical pages PP1 (lower page L) and PP2 (upper page U) of non-used block BK-B of flash chip CP1.

Thereafter, the remaining effective data in blocks BK-A, that is, the data of logical pages LP0, LP1, LP8 to LP255 are moved from, for example, physical pages PP0, PP3 to PP127 in blocks BK-A to physical pages PP3 to PP127 in blocks BK-B, and blocks BK-A are withdrawn.

However, in this case, the data of logical pages LP8, LP9 to LP252, LP253, LP255 stored in block BK-A of flash chip CP1 must be copied to block BK-B in flash chip CP0 (Copy 1).

Further, the data of logical pages LP10, LP11 to LP250, LP251, LP254 stored in block BK-A in flash chip CP0 must be copied to block BK-B in flash chip CP1 (Copy 2).

Figure 13:
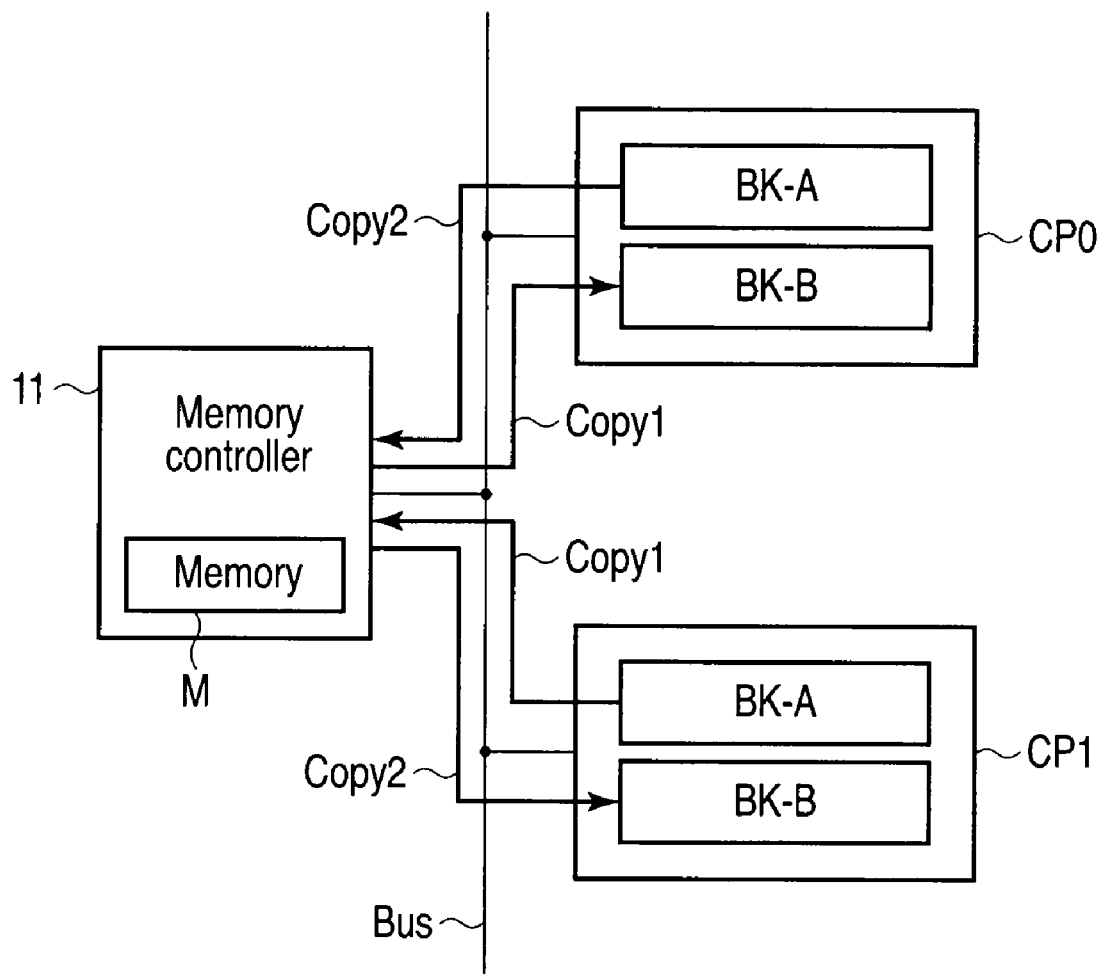
FIG. 13 shows a data transfer in an evacuation.

In the copy, data moves between two different chips. Thus, to execute the operation, an external memory for temporarily storing the data, for example, memory M is necessary in memory controller 11 as shown in FIG. 13.

Accordingly, even if the writing speed is increased by the zigzag interleave operation and the page shift operation, a long time is required to move the data when blocks BK-A are withdrawn after the data are overwritten. As a result of the increase of the withdrawal time, the writing speed cannot be greatly improved.

Note that, in the example, the data of logical page LP0 is copied from block BK-A to block BK-B in flash chip CP0 (Copy 3), and the data of logical pages LP255 and LP1 are copied from block BK-A to block BK-B in flash chip CP1 (Copy 4).

Incidentally, a flash chip (for example, a NAND flash memory) comprises a page buffer capable of temporarily storing data. Data can be moved at a high speed between different blocks in the flash chip making use of the page buffer.

Embodiments explained below propose a technology capable of greatly improving the writing speed by copying data in the same flash chip when blocks are withdrawn after the data is overwritten to the blocks, even if the data is overwritten by the zigzag interleave operation and the page shift operation.

7. Embodiments

Embodiments realize a high speed writing by a page shift operation and an interleave operation in such a manner that when logical pages are initially written and overwritten, temporary memories for temporarily storing the logical pages are used, and a movement of data between different flash chips is prevented when an old block is withdrawn.

A case that the interleave operation is executed by two flash chips and a case that the interleave operation is executed by 4 flash chips will be explained below.

(1) First Embodiment

In a first embodiment, the interleave operation is executed by two flash chips.

FIGS. 14 to 17 show a writing procedure of the first embodiment.

It is assumed here that one block is composed of 128 pages.

In an initial write, temporary memories T are used, and logical pages are written to new blocks BK-A in flash chips CP0, CP1 in the following order using two logical pages in pairs.

Figure 18:
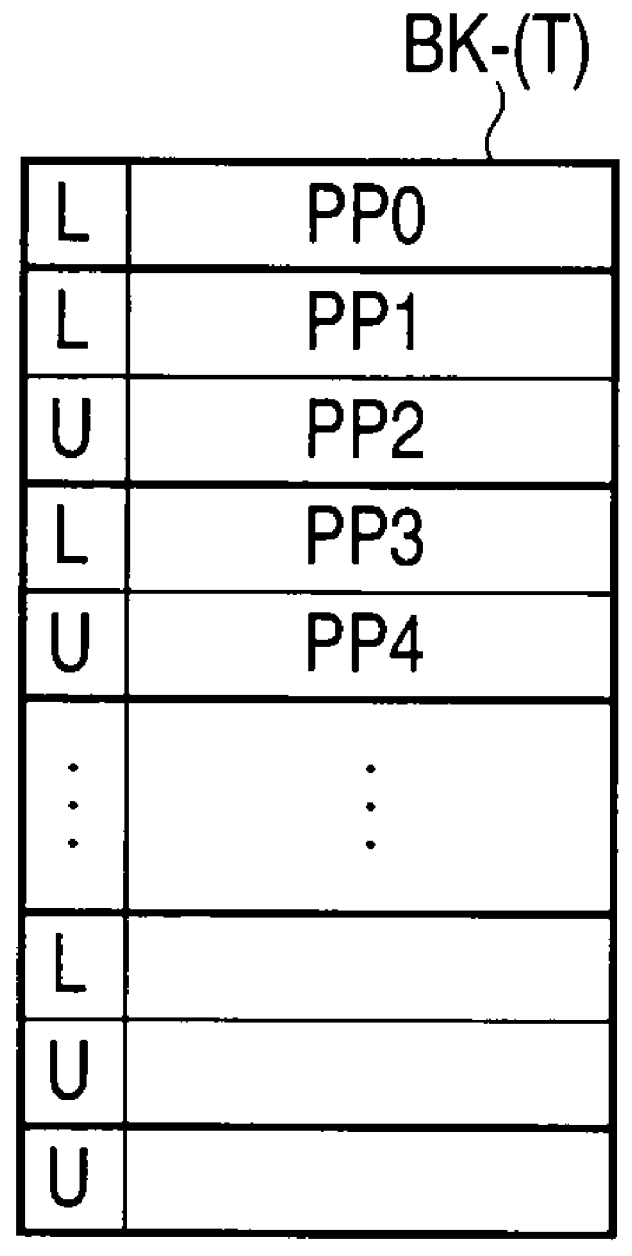

As shown in, for example, FIG. 18, lowermost physical pages PP0 (lower pages L) of blocks BK-(T) in flash chips CP0, CP1 can be used as temporary memories T. Further, although not related to the example, in at least an 8-level (3 bit) flash memory, physical pages PP0, PP1, . . . of blocks BK-(T) can be used as temporary memories T.

As a first step, two logical pages LP0, LP1 are continuously written in pairs to temporary memory T in flash chip CP0 and to physical page PP0 (lower page L) in block BK-A.

Next, as a second step, two logical pages LP2, LP3 are continuously written in pairs to temporary memory T in flash chip CP1 and to physical page PP0 (lower page L) in block BK-A.

At the first and second steps described above, write orders of the logical pages are not from a lower page to an upper page. However, when lowermost physical page PP0 (lower page L) of block BK-(T) in flash chip CP0 is used as temporary memory T, the high speed writing is not greatly restricted.

Next, as a third step, two logical pages LP4, LP5 are continuously written in pairs to physical page PP1 (lower page L) and physical page PP2 (upper page U) in block BK-A in flash chip CP0.

Next, as a fourth step, two logical pages LP6, LP7 are continuously written in pairs to physical page PP1 (lower page L) and physical page PP2 (upper page U) in block BK-A in flash chip CP1.

Since the write orders of the logical pages are from the lower page to the upper page at the third and fourth steps, the lower page and the upper page are input to one of flash chips CP0, CP1 making use of a Busy period caused by writing the upper page to the other of flash chips CP0, CP1 so that the high speed writing can be realized by the interleave operation.

Thereafter, logical pages LP8, LP9, LP10, LP11 LP252, LP253, LP254, LP255 are sequentially written likewise the third and fourth steps.

Finally, as a fifth step, logical page LP0 written to temporary memory T in flash chip CP0 is copied to uppermost physical page PP127 (upper page U) of block BK-A in flash chip CP0, and logical page LP2 written to temporary memory T in flash chip CP1 is copied to uppermost physical page PP127 (upper page U) of block BK-A in flash chip CP1.

Blocks BK-A in flash chips CP0, CP1, to which logical data LP0 to LP255 have been written, become blocks being used (old blocks).

Thereafter, a case that overwrite is executed will be examined.

Overwrite from Even-Numbered Logical Pages (LP) in Flash Chip CP0

Figure 14:
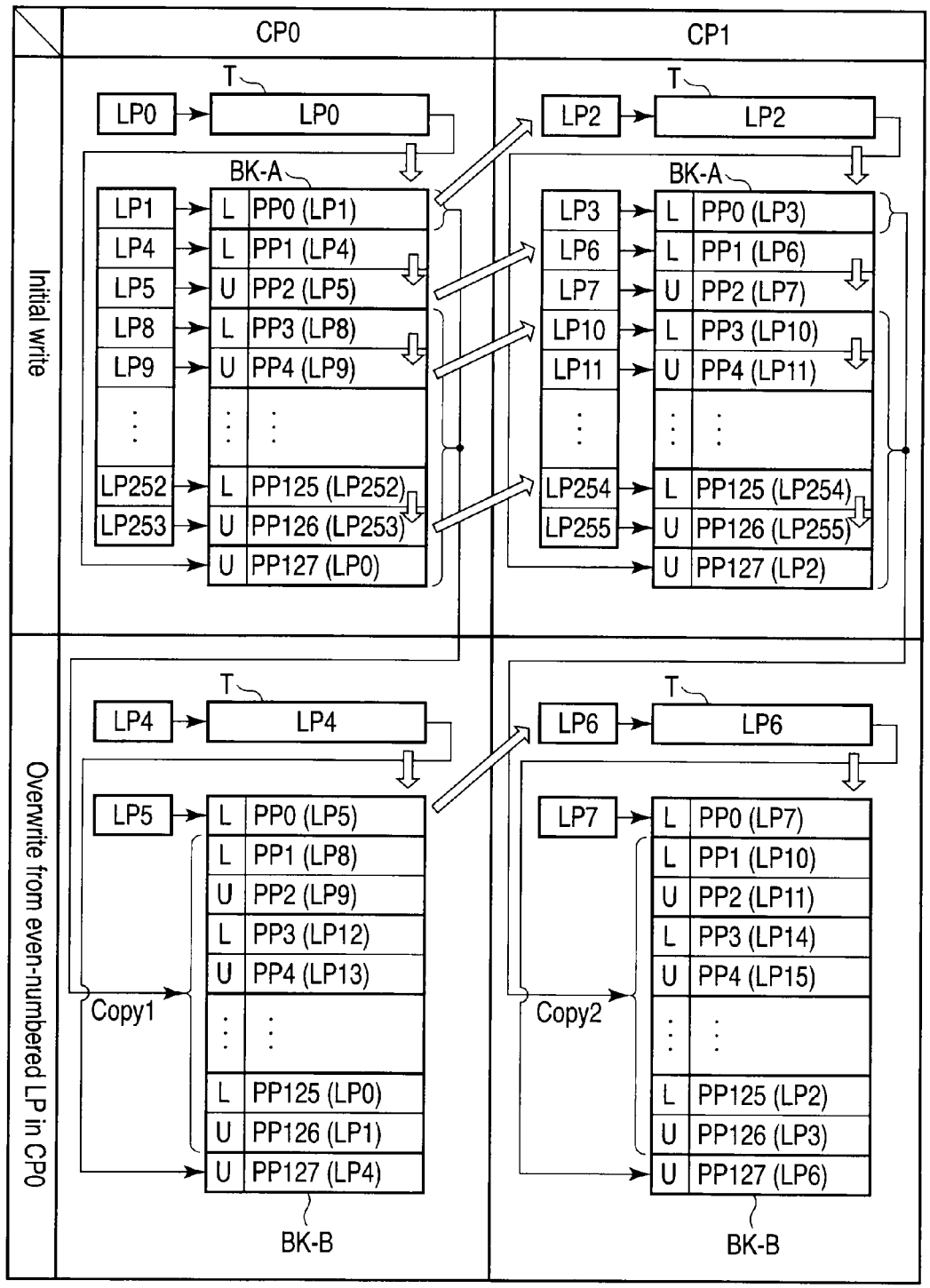

A writing procedure of the overwrite is as shown in FIG. 14.

It is assumed that the overwrite is executed to logical pages LP4 to LP7.

Temporary memories T are used also in the overwrite, and logical pages are written to new blocks BK-B in flash chips CP0, CP1 in the following order using two logical pages in pairs.

As a first step, two logical pages LP4, LP5 as overwriting data are continuously written in pairs to temporary memory T in flash chip CP0 and to physical page PP0 (lower page L) in block BK-B.

Next, as a second step, two logical pages LP6, LP7 as overwriting data are continuously written in pairs to temporary memory T in flash chip CP1 and to physical page PP0 (lower page L) in block BK-B.

At the first and second steps described above, although a write order of the logical pages is not from the lower page to the upper page, when lowermost physical page PP0 (lower page L) of blocks BK-(T) in flash chips CP0, CP1 are used as temporary memories T, the high speed writing is not greatly restricted.

Thereafter, logical pages LP8, LP9 to LP254, LP255 and logical pages LP0, LP1, LP2, LP3 are moved from old blocks BK-A in flash chips CP0, CP1 to new blocks BK-B, respectively (Copy 1, Copy 2), and old blocks BK-A are withdrawn.

First, as a third step, two logical pages LP8, LP9 of physical page PP3 (lower page L) and physical page PP4 (upper page U) in block BK-A in flash chip CP0 are continuously written in pairs to physical page PP1 (lower page L) and physical page PP2 (upper page U) in block BK-B in flash chip CP0.

Next, as a fourth step, two logical pages LP10, LP11 of physical page PP3 (lower page L) and physical page PP4 (upper page U) in block BK-A in flash chip CP1 are continuously written in pairs to physical page PP1 (lower page L) and physical page PP2 (upper page U) in block BK-B in flash chip CP1.

Since the write orders of the logical pages are from the lower page to the upper page at the third and fourth steps, the lower page and the upper page are input to one of flash chips CP0, CP1 making use of a Busy period caused by writing the upper page to the other of flash chips CP0, CP1 so that the high speed writing can be realized by the interleave operation.

Further, since data is moved only in the same flash chip at all times at the third and fourth steps, the high speed writing can be realized by reducing a withdrawal time making use of a high speed moving function of data between blocks mounted on the flash chip.

Thereafter, logical pages LP12, LP13, LP14, LP15 . . . LP252, LP253, LP254, LP255 and logical pages LP0, LP1, LP2, LP3 are sequentially written like the third and fourth steps.

Finally, as a fifth step, logical page LP4 written to temporary memory T in flash chip CP0 is copied to uppermost physical page PP127 (upper page U) of block BK-B in flash chip CP0, and logical page LP6 written to temporary memory T in flash chip CP1 is copied to uppermost physical page PP127 (upper page U) of block BK-B in flash chip CP1.

Blocks BK-B in flash chips CP0, CP1, to which logical data LP0 to LP255 have been written, become blocks being used (old blocks).

According to the writing procedure described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when an old block is withdrawn, since the data of the logical page moves only in the same flash chip, the high speed writing can be realized by reducing a withdrawal time making use of a high speed moving function of data between the blocks mounted on the flash chip.

Overwrite from Even-Numbered Logical Pages (LP) in Flash Chip CP1

A writing procedure of the overwrite is as shown in FIG. 15.

It is assumed that the overwrite is executed to logical pages LP2 to LP5.

Temporary memories T are used also in the overwrite, and logical pages are written to new blocks BK-B in flash chips CP0, CP1 in the following order using two logical pages in pairs.

As a first step, two logical pages LP2, LP3 as overwriting data are continuously written in pairs to temporary memory T in flash chip CP1 and to physical page PP0 (lower page L) in block BK-B.

Next, as a second step, two logical pages LP4, LP5 as overwriting data are continuously written in pairs to temporary memory T in flash chip CP0 and to physical page PP0 (lower page L) in block BK-B.

At the first and second steps described above, although a write order of the logical pages is not from the lower page to the upper page, when lowermost physical pages PP0 (lower pages L) of blocks BK-(T) in flash chips CP0, CP1 are used as temporary memories T, the high speed writing is not greatly restricted.

Thereafter, logical pages LP6, LP7 to LP254, LP255 and logical pages LP0, LP1 are moved from old blocks BK-A in flash chips CP0, CP1 to new blocks BK-B, respectively (Copy 1, Copy 2), and old blocks BK-A are withdrawn.

First, as a third step, two logical pages LP6, LP7 of physical page PP1 (lower page L) and physical page PP2 (upper page U) in block BK-A in flash chip CP1 are continuously written in pairs to physical page PP1 (lower page L) and physical page PP2 (upper page U) in block BK-B in flash chip CP1.

Next, as a fourth step, two logical pages LP8, LP9 of physical page PP3 (lower page L) and physical page PP4 (upper page U) in block BK-A in flash chip CP0 are continuously written in pairs to physical page PP1 (lower page L) and physical page PP2 (upper page U) in block BK-B in flash chip CP0.

Since the write orders of the logical pages are from the lower page to the upper page at the third and fourth steps, the lower page and the upper page are input to one of flash chips CP0, CP1 making use of a Busy period caused by writing the upper page to the other of flash chips CP0, CP1 so that the high speed writing can be realized by the interleave operation.

Further, since data is moved only in the same flash chip at all times at the third and fourth steps, the high speed writing can be realized by reducing a withdrawal time making use of the high speed moving function of data between the blocks mounted on the flash chip.

Thereafter, logical pages LP10, LP11, LP12, LP13 LP252, LP253, LP254, LP255 and logical pages LP0, LP1 are sequentially written like the third and fourth steps.

Finally, as a fifth step, logical page LP2 written to temporary memory T in flash chip CP1 is copied to uppermost physical page PP127 (upper page U) of block BK-B in flash chip CP1, and logical page LP4 written to temporary memory T in flash chip CP0 is copied to uppermost physical page PP127 (upper page U) of block BK-B in flash chip CP0.

Blocks BK-B in flash chips CP0, CP1, to which logical data LP0 to LP255 have been written, become blocks being used (old blocks).

According to the writing procedure described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when an old block is withdrawn, since the data of the logical page moves only in the same flash chip, the high speed writing can be realized by reducing a withdrawal time making use of the high speed moving function of data between blocks mounted on the flash chip.

Overwrite from Odd-Numbered Logical Pages (LP) in Flash Chip CP0

A writing procedure of the overwrite is as shown in FIG. 16.

It is assumed that the overwrite is executed to logical pages LP5 to LP7.

In the overwrite, only temporary memory T in flash chip CP1 is used, and logical pages are written to new blocks BK-B in flash chips CP0, CP1 using two logical pages in pairs in the following order.

As a first step, logical page LP5 as overwriting data is written to physical page PP0 (lower page L) in block BK-B in flash chip CP0.

Next, as a second step, two logical pages LP6, LP7 as overwriting data are continuously written in pairs to temporary memory T in flash chip CP1 and to physical page PP0 (lower page L) in block BK-B.

At the second step described above, although a write order of the logical pages is not from the lower page to the upper page, when lowermost physical page PP0 (lower page L) of block BK-(T) in flash chip CP1 is used as temporary memory T, the high speed writing is not greatly restricted.

Thereafter, logical pages LP8, LP9 to LP254, LP255 and logical pages LP0, LP1, LP2, LP3, LP4 are moved from old blocks BK-A in flash chips CP0, CP1 to new blocks BK-B, respectively (Copy 1, Copy 2), and old blocks BK-A are withdrawn.

First, as a third step, two logical pages LP8, LP9 of physical page PP3 (lower page L) and physical page PP4 (upper page U) in block BK-A in flash chip CP0 are continuously written in pairs to physical page PP1 (lower page L) and physical page PP2 (upper page U) in block BK-B in flash chip CP0.

Next, as a fourth step, two logical pages LP10, LP11 of physical page PP3 (lower page L) and physical page PP4 (upper page U) in block BK-A in flash chip CP1 are continuously written in pairs to physical page PP1 (lower page L) and physical page PP2 (upper page U) in block BK-B in flash chip CP1.

Since the write orders of the logical pages are from the lower page to the upper page at the third and fourth steps, the lower page and the upper page are input to one of flash chips CP0, CP1 making use of a Busy period caused by writing the upper page to the other of flash chips CP0, CP1 so that the high speed writing can be realized by the interleave operation.

Further, since data is moved only in the same flash chip at all times at the third and fourth steps, the high speed writing can be realized by reducing the withdrawal time making use of the high speed moving function of data between the blocks mounted on the flash chip.

Thereafter, logical pages LP12, LP13, LP14, LP15 . . . LP252, LP253, LP254, LP255 and logical pages LP0, LP1, LP2, LP3, LP4 are sequentially written like the third and fourth steps.

Finally, as a fifth step, logical page LP6 written to temporary memory T in flash chip CP1 is copied to uppermost physical page PP127 (upper page U) of block BK-B in flash chip CP1.

Blocks BK-B in flash chips CP0, CP1, to which logical data LP0 to LP255 have been written, become blocks being used (old blocks).

According to the writing procedure described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when the old blocks are withdrawn, since the data of the logical page moves only in the same flash chip, the high speed writing can be realized by reducing the withdrawal time making use of the high speed moving function of data between the blocks mounted on the flash chip.

Overwrite from Odd-Numbered Logical Pages (LP) in Flash Chip CP1

A writing procedure of the overwrite is as shown in FIG. 17.

It is assumed that the overwrite is executed to logical pages LP3 to LP5.

In the overwrite, only temporary memory T in flash chip CP0 is used, and logical pages are written to new blocks BK-B in flash chips CP0, CP1 using two logical pages in pairs in the following order.

As a first step, logical page LP3 as overwriting data is written to physical page PP0 (lower page L) in block BK-B in flash chip CP1.

Next, as a second step, two logical pages LP4, LP5 as overwriting data are continuously written in pairs to temporary memory T in flash chip CP0 and to physical page PP0 (lower page L) in block BK-B.

At the second step described above, although a write order of the logical pages is not from the lower page to the upper page, when lowermost physical page PP0 (lower page L) of block BK-(T) in flash chip CP0 is used as temporary memory T, the high speed writing is not greatly restricted.

Thereafter, logical pages LP6, LP7 to LP254, LP255 and logical pages LP0, LP1, LP2 are moved from old blocks BK-A in flash chips CP0, CP1 to new blocks BK-B, respectively (Copy 1, Copy 2), and old blocks BK-A are withdrawn.

First, as a third step, two logical pages LP6, LP7 of physical page PP1 (lower page L) and physical page PP2 (upper page U) in block BK-A in flash chip CP1 are continuously written in pairs to physical page PP1 (lower page L) and physical page PP2 (upper page U) in block BK-B in flash chip CP1.

Next, as a fourth step, two logical pages LP8, LP9 of physical page PP3 (lower page L) and physical page PP4 (upper page U) in block BK-A in flash chip CP0 are continuously written in pairs to physical page PP1 (lower page L) and physical page PP2 (upper page U) in block BK-B in flash chip CP0.

Since the write orders of the logical pages are from the lower page to the upper page at the third and fourth steps, the lower page and the upper page are input to one of flash chips CP0, CP1 making use of a Busy period caused by writing the upper page to the other of flash chips CP0, CP1 so that the high speed writing can be realized by the interleave operation.

Further, since data is moved only in the same flash chip at all times at the third and fourth steps, the high speed writing can be realized by reducing the withdrawal time making use of the high speed moving function of data between the blocks mounted on the flash chip.

Thereafter, logical pages LP10, LP11, LP12, LP13 . . . LP252, LP253, LP254, LP255 and logical pages LP0, LP1, LP2 are sequentially written like the third and fourth steps.

Finally, as a fifth step, logical page LP4 written to temporary memory T in flash chip CP0 is copied to uppermost physical page PP127 (upper page U) of block BK-B in flash chip CP0.

Blocks BK-B in flash chips CP0, CP1, to which logical data LP0 to LP255 have been written, become blocks being used (old blocks).

According to the writing procedure described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when the old blocks are withdrawn, since the data of the logical page moves only in the same flash chip, the high speed writing can be realized by reducing a withdrawal time making use of a high speed moving function of data between blocks mounted on the flash chip.

(2) Second Embodiment

In a second embodiment, the interleave operation is executed by the four flash chips.

FIGS. 19 to 22 show a writing procedure of the second embodiment.

It is assumed here that one block is composed of 128 pages.

In an initial write, temporary memories T are used, and logical pages are written to new blocks BK-A in flash chips CP0, CP1, CP2, CP3 in the following order using two logical pages in pairs.

As shown in, for example, FIG. 18, temporary memories T are lowermost physical pages PP0 (lower pages L) of blocks BK-(T) in flash chips CP0, CP1, CP2, CP3.

As a first step, two logical pages LP0, LP1 are continuously written in pairs to temporary memory T in flash chip CP0 and to physical page PP0 (lower page L) in block BK-A.

Next, as a second step, two logical pages LP2, LP3 are continuously written in pairs to temporary memory T in flash chip CP1 and to the physical page PP0 (lower page L) in block BK-A.

Next, as a third step, two logical pages LP4, LP5 are continuously written in pairs to temporary memory T in flash chip CP2 and to physical page PP0 (lower page L) in block BK-A.

Next, as a fourth step, two logical pages LP6, LP7 are continuously written in pairs to temporary memory T in flash chip CP3 and to physical page PP0 (lower page L) in block BK-A.

Next, as a fifth step, two logical pages LP8, LP9 are continuously written in pairs to physical page PP1 (lower page L) and physical page PP2 (upper page U) in block BK-A in flash chip CP0.

Next, as a sixth step, two logical pages LP10, LP11 are continuously written in pairs to physical page PP1 (lower page L) and physical page PP2 (upper page U) in block BK-A in flash chip CP1.

Next, as a seventh step, two logical pages LP12, LP13 are continuously written in pairs to physical page PP1 (lower page L) and physical page PP2 (upper page U) in block BK-A in flash chip CP2.

Next, as an eighth step, two logical pages LP14, LP15 are continuously written in pairs to physical page PP1 (lower page L) and physical page PP2 (upper page U) in block BK-A in flash chip CP3.

Thereafter, logical pages LP16, LP17 . . . LP510, LP511 are sequentially written like the fifth to eighth steps.

Finally, as a ninth step, logical page LP0 written to temporary memory T in flash chip CP0 is copied to uppermost physical page PP127 (upper page U) of block BK-A in flash chip CP0, and logical page LP2 written to temporary memory T in flash chip CP1 is copied to uppermost physical page PP127 (upper page U) of block BK-A in flash chip CP1.

Further, logical page LP4 written to temporary memory T in flash chip CP2 is copied to uppermost physical page PP127 (upper page U) of block BK-A in flash chip CP2, and logical page LP6 written to temporary memory T in flash chip CP3 is copied to uppermost physical page PP127 (upper page U) of block BK-A in flash chip CP3.

Blocks BK-A in flash chips CP0, CP1, CP2, CP3, to which logical data LP0 to LP511 have been written, become blocks being used (old blocks).

Thereafter, a case that overwrite is executed will be examined.

Overwrite from Even-Numbered Logical Pages (LP) in Flash Chip CP0

Figure 19:
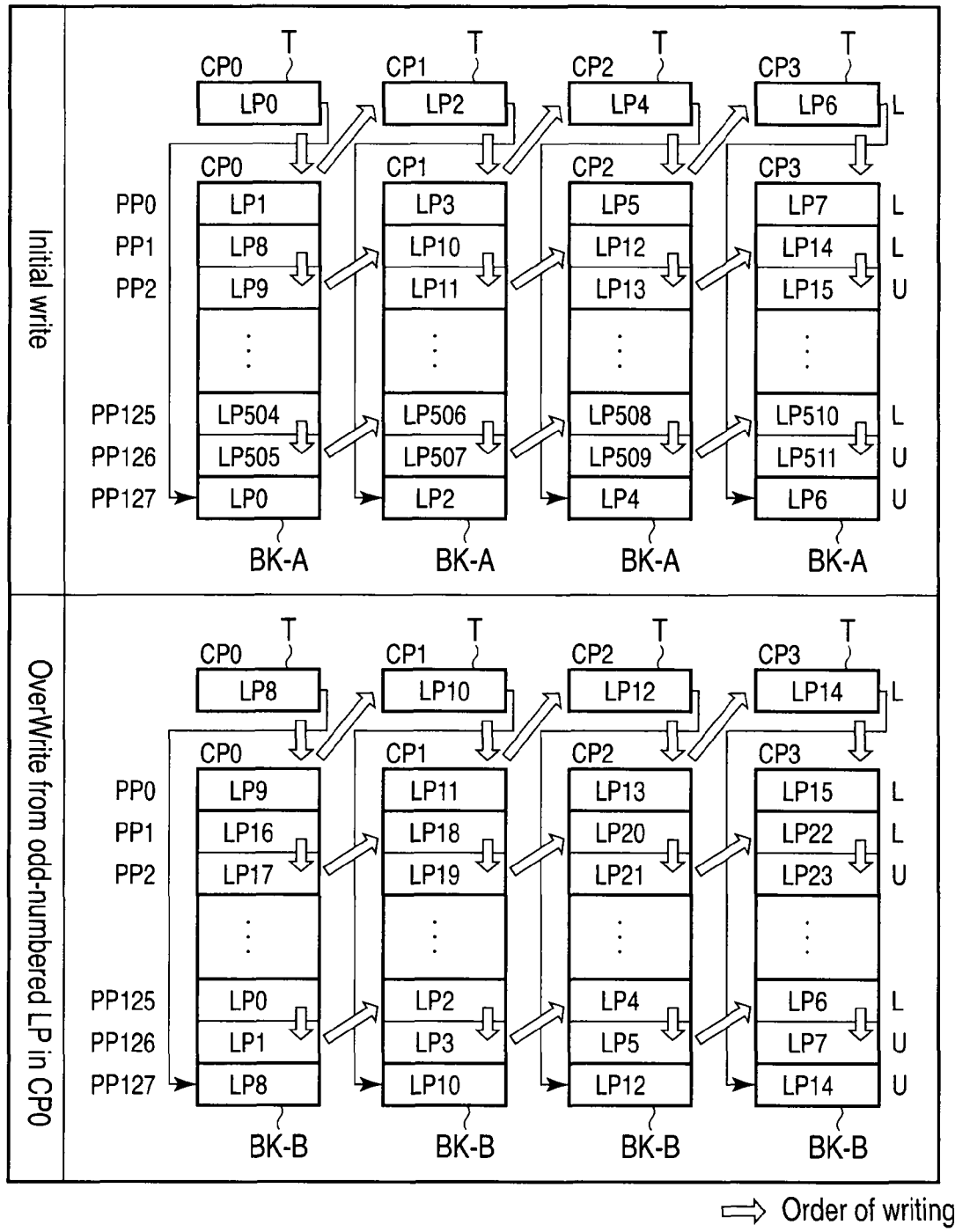

A writing procedure of the overwrite is as shown in FIG. 19.

It is assumed that the overwrite is executed to logical pages LP8 to LP15.

The temporary memories T are used also in the overwrite, and logical pages are written to new blocks BK-B in flash chips CP0, CP1, CP2, CP3 in the following order using two logical pages in pairs.

As a first step, two logical pages LP8, LP9 as overwriting data are continuously written in pairs to temporary memory T in flash chip CP0 and to physical page PP0 (lower page L) in block BK-B.

Next, as a second step, two logical pages LP10, LP11 as overwriting data are continuously written in pairs to temporary memory T in flash chip CP1 and to physical page PP0 (lower page L) in block BK-B.

Next, as a third step, two logical pages LP12, LP13 as overwriting data are continuously written in pairs to temporary memory T in flash chip CP2 and to physical page PP0 (lower page L) in block BK-B.

Next, as a fourth step, two logical pages LP14, LP15 as overwriting data are continuously written in pairs to temporary memory T in flash chip CP3 and to physical page PP0 (lower page L) in block BK-B.

Thereafter, logical pages LP16, LP17 to LP510, LP511 and logical pages LP0, LP1 to LP6, LP7 are moved from old blocks BK-A in flash chips CP0, CP1, CP2, CP3 to new blocks BK-B, respectively, and old blocks BK-A are withdrawn.

First, as a fifth step, two logical pages LP16, LP17 of physical page PP3 (lower page L) and physical page PP4 (upper page U) in block BK-A in flash chip CP0 are continuously written in pairs to physical page PP1 (lower page L) and physical page PP2 (upper page U) in block BK-B in flash chip CP0.

Next, as a sixth step, two logical pages LP18, LP19 of physical page PP3 (lower page L) and physical page PP4 (upper page U) in block BK-A in flash chip CP1 are continuously written in pairs to physical page PP1 (lower page L) and physical page PP2 (upper page U) in block BK-B in flash chip CP1.

Next, as a seventh step, two logical pages LP20, LP21 of physical page PP3 (lower page L) and physical page PP4 (upper page U) in block BK-A in flash chip CP2 are continuously written in pairs to physical page PP1 (lower page L) and physical page PP2 (upper page U) in block BK-B in flash chip CP2.

Next, as an eighth step, two logical pages LP22, LP23 of physical page PP3 (lower page L) and physical page PP4 (upper page U) in block BK-A in flash chip CP3 are continuously written in pairs to physical page PP1 (lower page L) and physical page PP2 (upper page U) in block BK-B in flash chip CP3.

Thereafter, logical pages LP24, LP25, . . . LP510, LP511 and logical pages LP0, LP1 to LP6, LP7 are sequentially written like the fifth to eighth steps.

Finally, as a ninth step, logical page LP8 written to temporary memory T in flash chip CP0 is copied to uppermost physical page PP127 (upper page U) of block BK-B in flash chip CP0, and logical page LP10 written to temporary memory T in flash chip CP1 is copied to uppermost physical page PP127 (upper page U) of block BK-B in flash chip CP1.

Further, logical page LP12 written to temporary memory T in flash chip CP2 is copied to uppermost physical page PP127 (upper page U) of block BK-B in flash chip CP2, and logical page LP14 written to temporary memory T in flash chip CP3 is copied to uppermost physical page PP127 (upper page U) of block BK-B in flash chip CP3.

Blocks BK-B in flash chips CP0, CP1, CP2, CP3, to which logical data LP0 to LP511 have been written, become blocks being used (old blocks).

According to the writing procedure described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when the old block is withdrawn, since the data of the logical page moves only in the same flash chip, the high speed writing can be realized by reducing a withdrawal time making use of a high speed moving function of data between blocks mounted on the flash chip.

Overwrite from Even-Numbered Logical Pages (LP) in Flash Chip CP2

Figure 20:
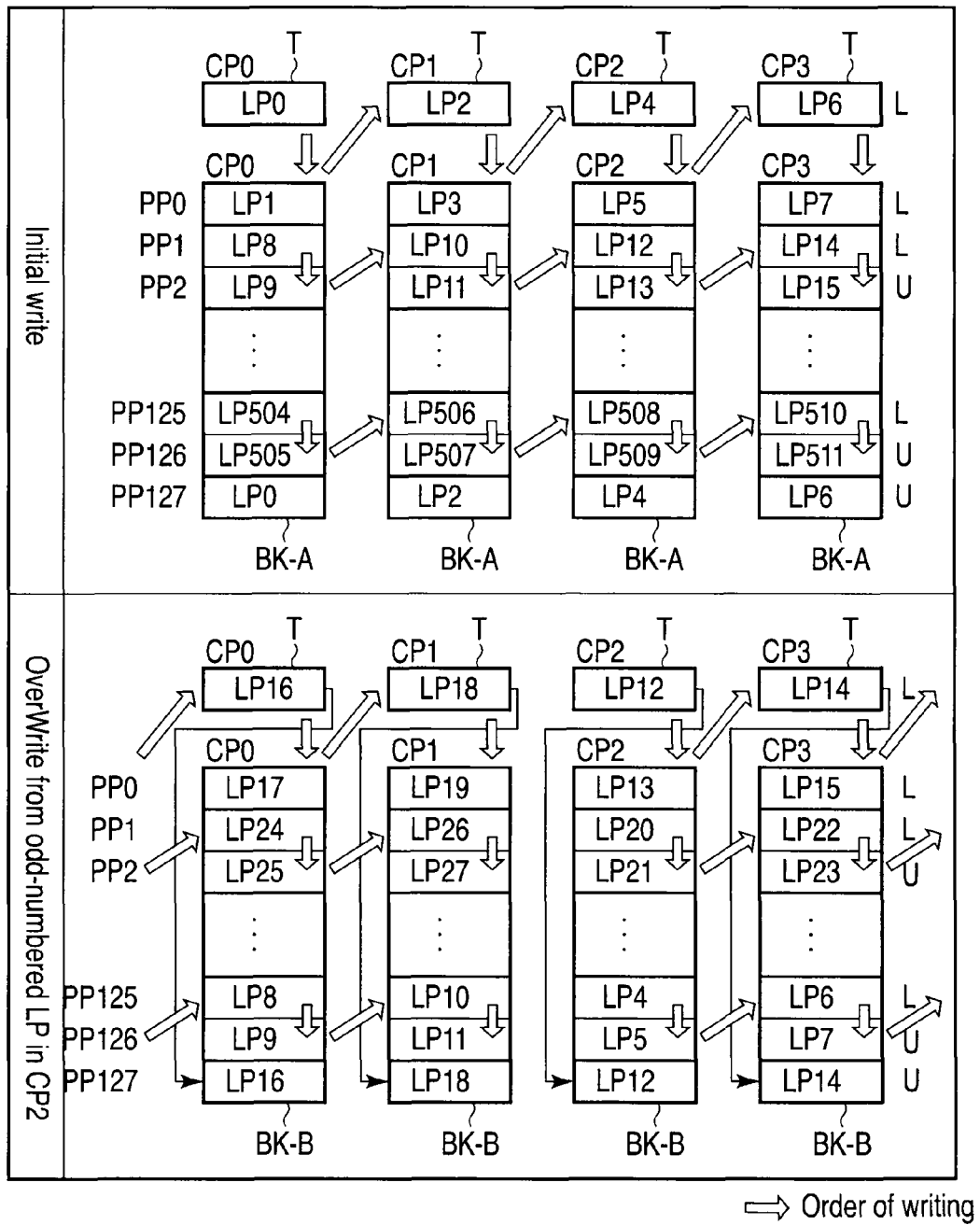

A writing procedure of the overwrite is as shown in FIG. 20.

It is assumed that the overwrite is executed to logical pages LP12 to LP19.

Temporary memories T are used also in the overwrite, and logical pages are written to new blocks BK-B in flash chips CP0, CP1, CP3, CP4 in the following order using two logical pages in pairs.

As a first step, two logical pages LP12, LP13 as overwriting data are continuously written in pairs to temporary memory T in flash chip CP2 and to physical page PP0 (lower page L) in block BK-B.

Next, as a second step, two logical pages LP14, LP15 as overwriting data are continuously written in pairs to temporary memory T in flash chip CP3 and to physical page PP0 (lower page L) in block BK-B.

Next, as a third step, two logical pages LP16, LP17 as overwriting data are continuously written in pairs to temporary memory T in flash chip CP0 and to physical page PP0 (lower page L) in block BK-B.

Next, as a fourth step, two logical pages LP18, LP19 as overwriting data are continuously written in pairs to temporary memory T in flash chip CP1 and to physical page PP0 (lower page L) in block BK-B.

Thereafter, logical pages LP20, LP21 to LP510, LP511 and logical pages LP0, LP1 to LP10, LP11 are moved from old blocks BK-A in flash chips CP0, CP1, CP2, CP3 to new blocks BK-B, respectively, and old blocks BK-A are withdrawn.

First, as a fifth step, two logical pages LP20, LP21 of physical page PP3 (lower page L) and physical page PP4 (upper page U) in block BK-A in flash chip CP2 are continuously written in pairs to physical page PP1 (lower page L) and physical page PP2 (upper page U) in block BK-B in flash chip CP2.

Next, as a sixth step, two logical pages LP22, LP23 of physical page PP3 (lower page L) and physical page PP4 (upper page U) in block BK-A in flash chip CP3 are continuously written in pairs to physical page PP1 (lower page L) and physical page PP2 (upper page U) in block BK-B in flash chip CP3.

Next, as a seventh step, two logical pages LP24, LP25 of physical page PP5 (lower page L) and physical page PP6 (upper page U) in block BK-A in flash chip CP0 are continuously written in pairs to physical page PP1 (lower page L) and physical page PP2 (upper page U) in block BK-B in flash chip CP0.

Next, as an eighth step, two logical pages LP26, LP27 of physical page PP5 (lower page L) and physical page PP6 (upper page U) in block BK-A in flash chip CP1 are continuously written in pairs to physical page PP1 (lower page L) and physical page PP2 (upper page U) in block BK-B in flash chip CP1.

Thereafter, logical pages LP28, LP29 ... LP510, LP511 and logical pages LP0, LP1 to LP10, LP11 are sequentially written like the fifth to eighth steps.

Finally, as a ninth step, logical page LP12 written to temporary memory T in flash chip CP2 is copied to uppermost physical page PP127 (upper page U) of block BK-B in flash chip CP2, and logical page LP14 written to temporary memory T in flash chip CP3 is copied to uppermost physical page PP127 (upper page U) of block BK-B in flash chip CP3.

Further, logical page LP16 written to temporary memory T in flash chip CP0 is copied to uppermost physical page PP127 (upper page U) of block BK-B in flash chip CP0, and logical page LP18 written to temporary memory T in flash chip CP1 is copied to uppermost physical page PP127 (upper page U) of block BK-B in flash chip CP1.

Blocks BK-B in flash chips CP0, CP1, CP2, CP3, to which logical data LP0 to LP511 have been written, become blocks being used (old blocks).

According to the writing procedure described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when an old block is withdrawn, since the data of the logical page moves only in the same flash chip, the high speed writing can be realized by reducing a withdrawal time making use of a high speed moving function of data between blocks mounted on the flash chip.

Overwrite from Odd-Numbered Logical Pages (LP) in Flash Chip CP0

Figure 21:
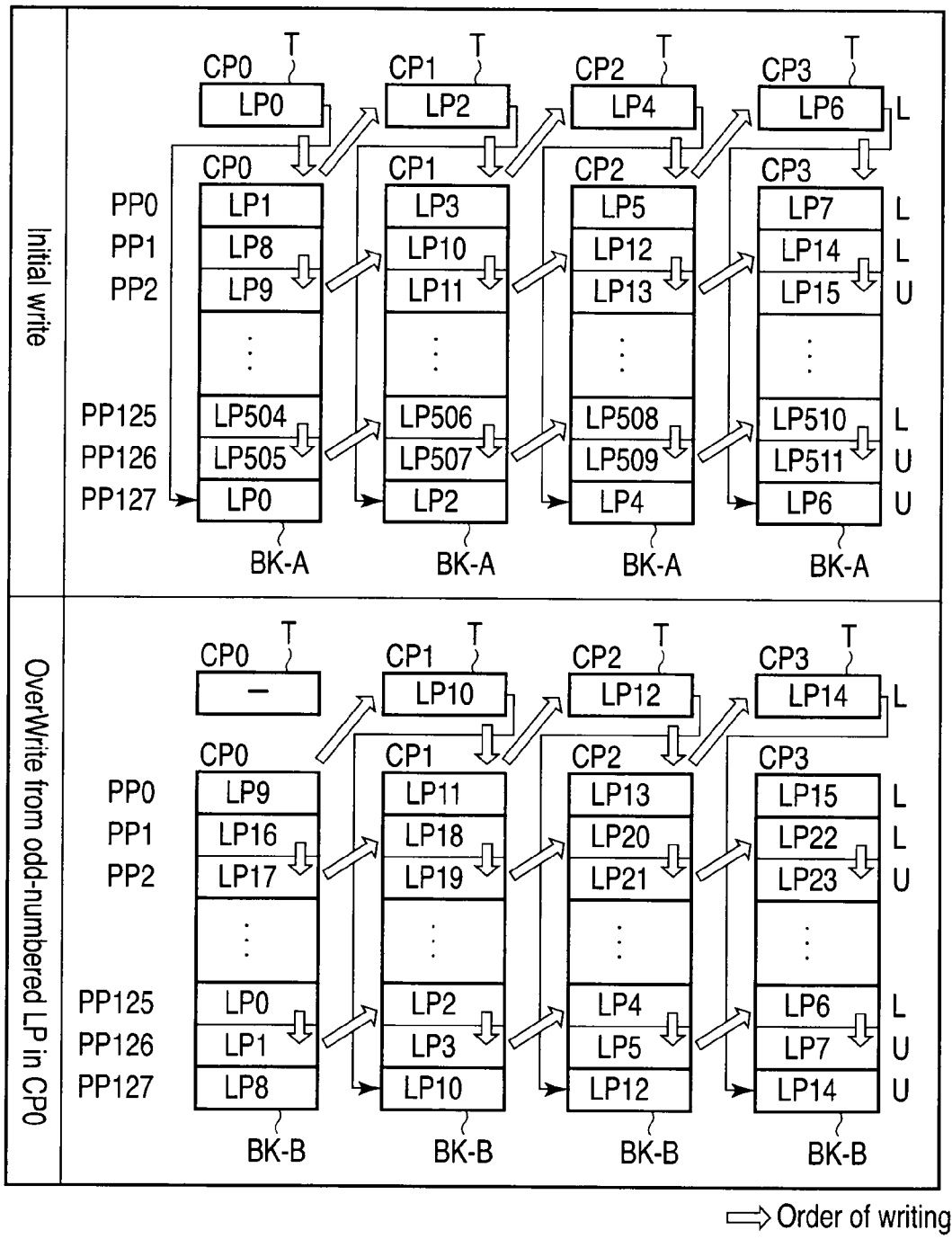

A writing procedure of the overwrite is as shown in FIG. 21.

It is assumed that the overwrite is executed to logical pages LP9 to LP15.

In the overwrite, temporary memories T in flash chip CP1, CP2, CP3 are used, and logical pages are written to new blocks BK-B in flash chips CP0, CP1, CP2, CP3 using two logical pages in pairs in the following order.

As a first step, logical page LP9 as overwriting data is written to physical page PP0 (lower page L) in block BK-B in flash chip CP0.

Next, as a second step, two logical pages LP10, LP11 as overwriting data are continuously written in pairs to temporary memory T in flash chip CP1 and to physical page PP0 (lower page L) in block BK-B.

Next, as a third step, two logical pages LP12, LP13 as overwriting data are continuously written in pairs to temporary memory T in flash chip CP2 and to physical page PP0 (lower page L) in block BK-B.

Next, as a fourth step, two logical pages LP14, LP15 as overwriting data are continuously written in pairs to temporary memory T in flash chip CP3 and to physical page PP0 (lower page L) in block BK-B.

Thereafter, logical pages LP16, LP17 to LP510, LP511 and logical pages LP0, LP1 to LP6, LP7 are moved from old blocks BK-A in flash chips CP0, CP1, CP2, CP3 to new blocks BK-B, and old blocks BK-A are withdrawn.

First, as a fifth step, two logical pages LP16, LP17 of physical page PP3 (lower page L) and physical page PP4 (upper page U) in block BK-A in flash chip CP0 are continuously written in pairs to physical page PP1 (lower page L) and physical page PP2 (upper page U) in block BK-B in flash chip CP0.

Next, as a sixth step, two logical pages LP18, LP19 of physical page PP3 (lower page L) and physical page PP4 (upper page U) in block BK-A in flash chip CP1 are continuously written in pairs to physical page PP1 (lower page L) and physical page PP2 (upper page U) in block BK-B in flash chip CP1.

Next, as a seventh step, two logical pages LP20, LP21 of physical page PP3 (lower page L) and physical page PP4 (upper page U) in block BK-A in flash chip CP2 are continuously written in pairs to physical page PP1 (lower page L) and physical page PP2 (upper page U) in block BK-B in flash chip CP2.

Next, as an eighth step, two logical pages LP22, LP23 of physical page PP3 (lower page L) and physical page PP4 (upper page U) in block BK-A in flash chip CP3 are continuously written in pairs to physical page PP1 (lower page L) and physical page PP2 (upper page U) in block BK-B in flash chip CP3.

Thereafter, logical pages LP24, LP25 ... LP510, LP511 and logical pages LP0, LP1 to LP6, LP7, LP8 are sequentially written like the fifth to eighth steps.

Finally, as a ninth step, logical page LP10 written to temporary memory T in flash chip CP1 is copied to uppermost physical page PP127 (upper page U) of block BK-B in flash chip CP1.

Further, logical page LP12 written to temporary memory T in flash chip CP2 is copied to uppermost physical page PP127 (upper page U) of block BK-B in flash chip CP2, and logical page LP14 written to temporary memory T in flash chip CP3 is copied to uppermost physical page PP127 (upper page U) of block BK-B in flash chip CP3.

Blocks BK-B in flash chips CP0, CP1, CP2, CP3, to which logical data LP0 to LP511 have been written, become blocks being used (old blocks).

According to the writing procedure described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when an old block is withdrawn, since the data of the logical page moves only in the same flash chip, the high speed writing can be realized by reducing a withdrawal time making use of a high speed moving function of data between blocks mounted on the flash chip.

Overwrite from Odd-Numbered Logical Pages (LP) in Flash Chip CP2

A writing procedure of the overwrite is as shown in FIG. 22.

It is assumed that the overwrite is executed to logical pages LP13 to LP19.

In the overwrite, temporary memories T in flash chips CP0, CP1, CP3 are used, and logical pages are written to new blocks BK-B in flash chips CP0, CP1, CP2, CP3 using two logical pages as pairs in the following order.

As a first step, logical page LP13 as overwriting data is written to physical page PP0 (lower page L) in block BK-B in flash chip CP2.

Next, as a second step, two logical pages LP14, LP15 as overwriting data are continuously written in pairs to temporary memory T in flash chip CP3 and to physical page PP0 (lower page L) in block BK-B.

Next, as a third step, two logical pages LP16, LP17 as overwriting data are continuously written in pairs to temporary memory T in flash chip CP0 and to physical page PP0 (lower page L) in block BK-B.

Next, as a fourth step, two logical pages LP18, LP19 as overwriting data are continuously written in pairs to temporary memory T in flash chip CP1 and to physical page PP0 (lower page L) in block BK-B.

Thereafter, logical pages LP20, LP21 to LP510, LP511 and logical pages LP0, LP1 to LP10, LP11, L12 are moved from old blocks BK-A in flash chips CP0, CP1, CP2, CP3 to new blocks BK-B, and old blocks BK-A are withdrawn.

First, as a fifth step, two logical pages LP20, LP21 of physical page PP3 (lower page L) and physical page PP4 (upper page U) in block BK-A in flash chip CP2 are continuously written in pairs to physical page PP1 (lower page L) and physical page PP2 (upper page U) in block BK-B in flash chip CP2.

Next, as a sixth step, two logical pages LP22, LP23 of physical page PP3 (lower page L) and physical page PP4 (upper page U) in block BK-A in flash chip CP3 are continuously written in pairs to physical page PP1 (lower page L) and physical page PP2 (upper page U) in block BK-B in flash chip CP3.

Next, as a seventh step, two logical pages LP24, LP25 of physical page PP5 (lower page L) and physical page PP6 (upper page U) in block BK-A in flash chip CP0 are continuously written in pairs to physical page PP1 (lower page L) and physical page PP2 (upper page U) in block BK-B in flash chip CP0.

Next, as an eighth step, two logical pages LP26, LP27 of physical page PP5 (lower page L) and physical page PP6 (upper page U) in block BK-A in flash chip CP1 are continuously written in pairs to physical page PP1 (lower page L) and physical page PP2 (upper page U) in block BK-B in flash chip CP1.

Thereafter, logical pages LP28, LP29 ... LP510, LP511 and logical pages LP0, LP1 to LP10, LP11, LP12 are sequentially written like the fifth to eighth steps.

Finally, as a ninth step, logical page LP14 written to temporary memory T in flash chip CP3 is copied to uppermost physical page PP127 (upper page U) of block BK-B in flash chip CP3.

Further, logical page LP16 written to temporary memory T in flash chip CP0 is copied to uppermost physical page PP127 (upper page U) of block BK-B in flash chip CP0, and logical page LP18 written to temporary memory T in flash chip CP1 is copied to uppermost physical page PP127 (upper page U) of block BK-B in flash chip CP1.

Blocks BK-B in flash chips CP0, CP1, CP2, CP3, to which logical data LP0 to LP511 have been written, become blocks being used (old blocks).

According to the writing procedure described above, even if a logical page is repeatedly overwritten from any of logical pages by the page shift operation, an order of the logical pages in the same flash chip is not disturbed. In other words, the order of the logical pages only shifts in the same flash chip each time a block changes.

Accordingly, when an old block is withdrawn, since the data of the logical page moves only in the same flash chip, the high speed writing can be realized by reducing a withdrawal time making use of a high speed moving function of data between blocks mounted on the flash chip.

8. Application Examples

A NAND flash memory, for example, is available as application examples.

An example of a memory system using the NAND flash memory of Embodiments will be explained below.

In the application examples, it is assumed that the NAND flash memory is a packaged product.

(1) Interleave Operation in One NAND Flash Memory

Figure 23:
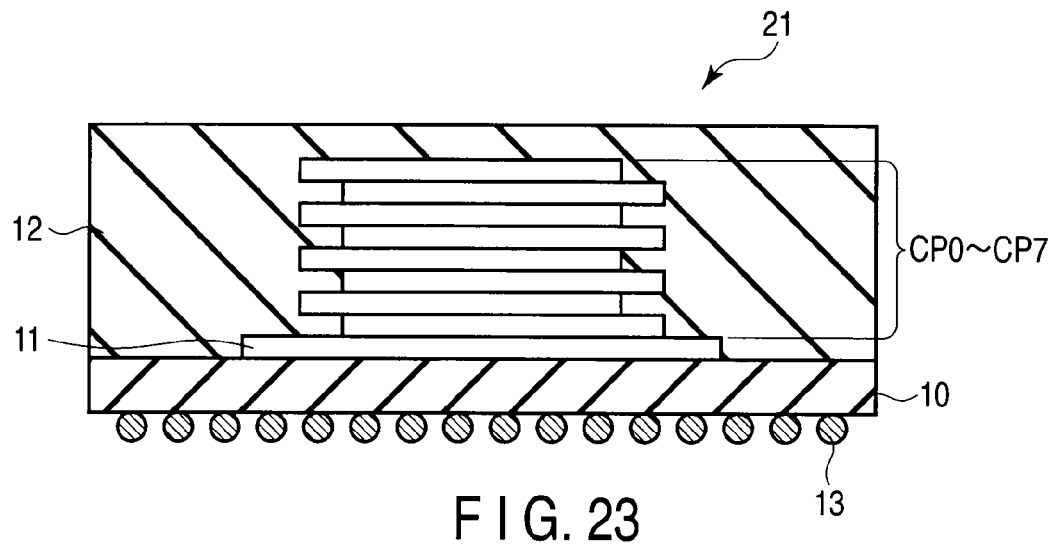
FIG. 23 shows an example of a NAND flash memory.

FIG. 23 shows an example of the NAND flash memory.

NAND flash memory 21 comprises one memory controller 11 and eight NAND flash chips CP0 to CP7.

An interleave operation of Embodiments is controlled by memory controller 11.

Memory controller (controller chip) 11 is mounted on one surface of package board 10. Eight NAND flash chips CP0 to CP7 are mounted on memory controller 11.

Memory controller 11 and eight NAND flash chips CP0 to CP7 are electrically connected to each other by, for example, bonding wires, TSVs (through-silicon-vias), and the like and covered with resin 12.

Bumps 13 as external terminals are mounted on the other surface of package board 10.

Figure 24:
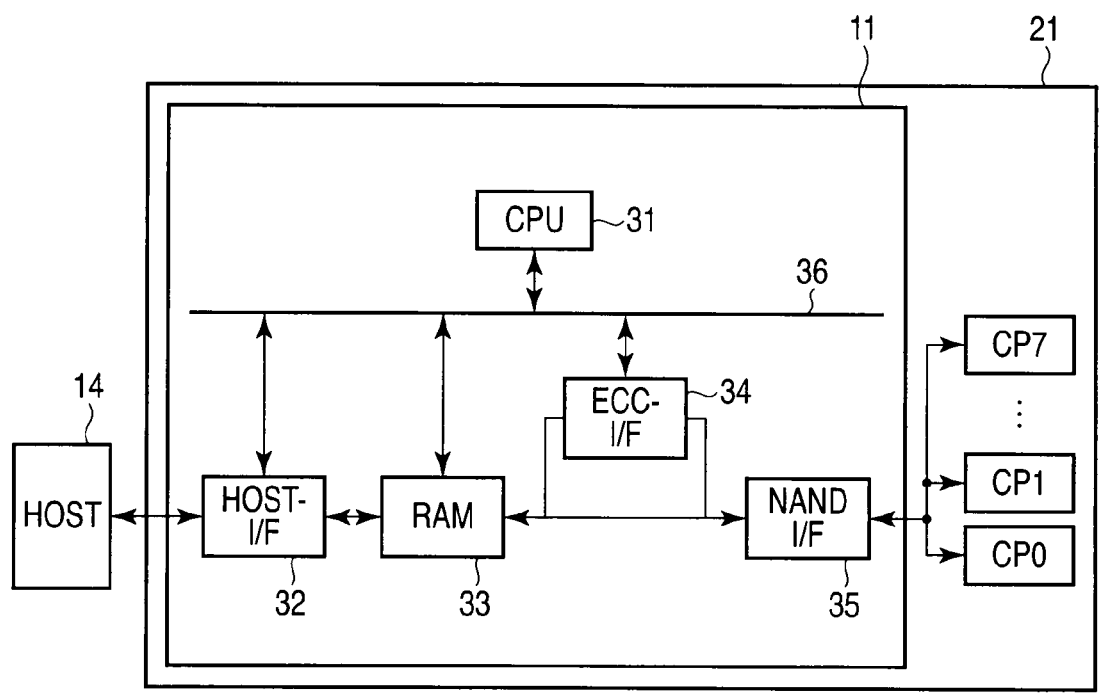

FIG. 24 shows an example of memory controller 11.

Memory controller 11 comprises CPU (Central Processing Unit) 31, HOST interface (HOST-I/F) 32, RAM (Random Access Memory) 33, ECC interface (ECC-I/F) 34, and NAND interface 35.

These elements are connected to each other through bus 36.

HOST interface 32 is composed of, for example, a USB (Universal Serial Bus) interface and controls data transmission and reception to and from host 14 based on the USB Standard as a data transfer standard.

CPU 31 controls the memory system using, for example, firmware.

Further, CPU 31 receives write/read/erase commands from host 14 and controls write/read/erase operations to 8 NAND flash chips CP0 to CP7.

RAM 33 is used as a work area of CPU 31 and temporarily stores data and a conversion table.

ECC interface 34 executes an error correction process to data from, for example, bus 36. NAND interface 35 controls data transmission and reception to and from 8 NAND flash chips CP0 to CP7.

(2) Interleave Operation Between NAND Flash Memories

FIG. 25 shows an example of memory controller 11.

In the system, an inter-channel interleave is executed. One channel corresponds to one NAND flash memory. An interleave operation of Embodiments is executed between channels and controlled by memory controller 11.

Memory controller 11 comprises CPU 31, HOST interface (HOST-I/F) 32, RAM 33, ECC interface (ECC-I/F) 34, and NAND interface 35.

These elements are connected to each other through bus 36.

HOST interface 32 is composed of, for example, a USB interface and controls data transmission and reception to and from host 14 based on the USB Standard as a data transfer standard.

CPU 31 controls the memory system using, for example, firmware.

Further, CPU 31 receives write/read/erase commands from host 14 and controls write/read/erase operations to NAND flash memories (two NAND flash memories in the example) 21-1, 21-2.

Each of NAND flash memories 21-1, 21-2 is composed of one product shown in, for example, FIG. 23.

RAM 33 is used as a work area of CPU 31 and temporarily stores data and a conversion table.

ECC interface 34 executes an error correction process to data from, for example, bus 36. NAND interface 35 controls data transmission and reception to and from 8 NAND flash chips CP0 to CP7.

9. Conclusion

According to the embodiments described above, a high speed writing to a flash memory can be realized by the interleave operation.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:
a first memory chip comprising a first temporary memory and a first block;
a second memory chip comprising a second temporary memory and a second block; and
a memory controller that controls writing data to the first and second memory chips,
wherein the first and second memory chips are each a multi-level flash memory that stores n (n is a natural number of at least 2) bits in one memory cell,
the first and second blocks each comprise physical pages and the writing is executed to each physical page from a lowermost physical page to an uppermost physical page,
physical pages other than the lowermost physical page and the uppermost physical page are provided as a repetition of first units, each of the first units comprises pages having a different write times, and
the memory controller writes data by an interleave operation in order of the first unit by the first temporary memory and the lowermost physical page in the first block, the first unit by the second temporary memory and the lowermost physical page in the second block, the first unit in the first block, and the first unit in the second block.

2. The system according to claim 1,
wherein the first memory chip comprises a third block having the same configuration as the first block, and the second memory chip comprises a third temporary memory and a fourth block having the same configuration as the second block, and
when data is overwritten from an upper page in the first block, the memory controller overwrites data by the interleave operation in order of a lowermost physical page in the third block, the first unit by the third temporary memory and a lowermost physical page of the fourth block the first unit in the third block, and the first unit in the fourth block.

3. The system according to claim 1,
wherein data written to the first temporary memory is copied to an uppermost physical page in the first block, and data written to the second temporary memory is copied to an uppermost physical page in the second block.

4. The system according to claim 1,
wherein the first temporary memory includes lowermost physical pages of a third block in the first memory chip, and the second temporary memory includes lowermost physical pages of a fourth block in the second memory chip.

5. The system according to claim 1,
wherein the first temporary memory is a page buffer in the first memory chip, and the second temporary memory is a page buffer in the second memory chip.

6. The system according to claim 1,
wherein the first and second memory chips are NAND flash memories.

* * * * *